US010158988B2

(12) United States Patent
Lalwaney

(10) Patent No.: US 10,158,988 B2
(45) Date of Patent: Dec. 18, 2018

(54) MULTI-SIM BASED DEVICE AUTO CONFIGURATION SYSTEM AND PROCESS

(71) Applicant: QUALCOMM Incorporated, San Diego, CA (US)

(72) Inventor: Poornima Assudo Lalwaney, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 14/340,382

(22) Filed: Jul. 24, 2014

(65) Prior Publication Data
US 2016/0029204 A1 Jan. 28, 2016

(51) Int. Cl.
H04W 8/22 (2009.01)
H04W 8/20 (2009.01)
H04W 8/18 (2009.01)

(52) U.S. Cl.
CPC ............. *H04W 8/22* (2013.01); *H04W 8/205* (2013.01); *H04W 8/18* (2013.01)

(58) Field of Classification Search
CPC .......... H04W 8/22; H04W 8/205; H04W 8/18
USPC ............... 455/558, 552.1, 432.1–435.3, 418; 370/254, 329; 709/223; 705/304, 4
See application file for complete search history.

(56) References Cited

U.S. PATENT DOCUMENTS

| 6,999,781 | B1 | 2/2006 | Wallenius | |
| 7,277,701 | B2 | 10/2007 | Almgren | |
| 8,103,309 | B2 | 1/2012 | Lee | |
| 9,198,045 | B1* | 11/2015 | Ghoshal | H04W 4/001 |
| 2002/0147012 | A1* | 10/2002 | Leung | H04W 48/18 455/433 |
| 2004/0249915 | A1* | 12/2004 | Russell | G01S 5/0252 709/223 |
| 2005/0164737 | A1 | 7/2005 | Brown | |
| 2006/0218241 | A1* | 9/2006 | Fok | H04W 8/205 709/217 |

(Continued)

FOREIGN PATENT DOCUMENTS

| CN | 101267631 B | 11/2011 |
| EP | 2056630 A1 | 5/2009 |

(Continued)

OTHER PUBLICATIONS

International Search Report and Written Opinion—PCT/US2015/036684—ISA/EPO—dated Sep. 17, 2015.

*Primary Examiner* — Kamran Afshar
*Assistant Examiner* — Farid Seyedvosoghi
(74) *Attorney, Agent, or Firm* — Paradice and Li LLP

(57) ABSTRACT

Systems and methods are described for configuring a user equipment ("UE"). The UE stores a plurality of configuration routines and receives at least one subscriber identity module (SIM). The UE selects a target set of configuration routines from the plurality of configuration routines based, at least in part, on at least one parameter value stored on one of the at least one SIMs, the target set of configuration routines comprising at least one of the plurality of configuration routines. The target set of configuration routines includes some, but not all of the plurality of configuration routines stored by the UE. At least one setting of the UE is then configured based, at least in part, on the target set of configuration routines.

29 Claims, 9 Drawing Sheets

(56) References Cited

U.S. PATENT DOCUMENTS

| | | | |
|---|---|---|---|
| 2007/0021149 A1* | 1/2007 | Abbassikhah | H04W 88/06 455/558 |
| 2011/0143753 A1* | 6/2011 | Rahman | H04W 48/16 455/432.1 |
| 2011/0195700 A1* | 8/2011 | Kukuchka | H04W 8/18 455/422.1 |
| 2011/0281551 A1* | 11/2011 | Gonzalez | H04M 15/00 455/406 |
| 2012/0051262 A1* | 3/2012 | Clark | H04M 1/7253 370/254 |
| 2012/0101952 A1* | 4/2012 | Raleigh | G06Q 30/016 705/304 |
| 2012/0108204 A1* | 5/2012 | Schell | H04W 8/205 455/411 |
| 2012/0289197 A1* | 11/2012 | Holtmanns | H04W 8/183 455/411 |
| 2012/0309344 A1* | 12/2012 | Ferrazzini | H04M 1/72519 455/406 |
| 2013/0095794 A1 | 4/2013 | Lhamon et al. | |
| 2013/0115948 A1 | 5/2013 | Kukuchka et al. | |
| 2013/0184029 A1* | 7/2013 | Lim | G06F 9/4448 455/551 |
| 2013/0272230 A1* | 10/2013 | Dinan | H04W 52/18 370/329 |
| 2013/0295902 A1* | 11/2013 | Justen | H04W 4/001 455/418 |
| 2014/0200929 A1* | 7/2014 | Fitzgerald | G06F 21/88 705/4 |
| 2014/0213233 A1* | 7/2014 | Parry | H04W 24/02 455/418 |

FOREIGN PATENT DOCUMENTS

| | | |
|---|---|---|
| WO | 2013039900 A1 | 3/2013 |
| WO | 2013189193 A1 | 12/2013 |
| WO | 2014092385 A1 | 6/2014 |

* cited by examiner

MULTI-SIM BASED DEVICE AUTO CONFIGURATION SYSTEM AND PROCESS

BACKGROUND

1. Field

Embodiments described herein generally relate to systems and processes for configuration of a user equipment and, particular embodiments relate to methods, apparatus, and computer program products for using subscriber identity module (SIM) technology for a complete device auto configuration.

2. Background

Proper operational settings and parameters for modern mobile communication devices can differ significantly from one geographic region to another and from one service provider (or subscription service) to another. Original equipment manufacturers (OEMs) must develop and manufacture necessary hardware and software variants to accommodate differences of mobile device configuration practices and standards between regions and service providers in deploying mobile devices in multiple regions and/or for multiple service providers (e.g., for a global launch of the mobile device).

For example, each region or service provider may have different RF bands and modem standards, application/software configuration standards, hardware drivers, and/or of the like. The OEMs can spend a considerable amount of time and resources in designing, implementing, and manufacturing hardware and software variants for different regions, service providers or services throughout the global market of a device.

SUMMARY

Various embodiments relate to systems and methods for enabling a complete device configuration (of hardware, modem, media, and/or applications) of a user equipment (UE) at build and/or runtime, based on parameters stored on one or more SIMs inserted or otherwise connected to the UE. Each SIM may contain a set of parameters for which the UE may be configured, where the parameters correspond to a predefined region (e.g., country or other defined geographic area), service provider, service, or any combination thereof.

Embodiments described herein relate to systems and methods for configuring a UE including storing, by the UE, a plurality of configuration routines; receiving, by the UE, at least one subscriber identity module (SIM); selecting, by the UE, a target set of configuration routines from the plurality of configuration routines based, at least in part, on at least one parameter value stored on each of the at least one SIM, the target set of configuration routines comprising at least one of the plurality of configuration routines; and configuring at least one setting of the UE based, at least in part, on the target set of configuration routines.

In some embodiments, the at least one setting of the UE comprises at least one of RF settings, modem settings, hardware settings, application settings, and media settings of the UE.

In some embodiments, the storing of the plurality of configuration routines comprises classifying each of the plurality of configuration routines to be at least one of: a region-specific configuration routine, service provider-specific configuration routine, and a device-specific configuration routine.

In some embodiments, the region-specific configuration routine is associated with a region, the region is associated with at least one service provider. The region-specific configuration routine is associated with configuration instructions applied to UEs operating in a region. The service provider-specific configuration routine is associated with a service provider. The service provider is one of the at least one service provider associated with the region. The service provider-specific configuration routine is associated with configuration instructions applied to UEs operated by a service provider.

In various embodiments, the region-specific configuration routine includes at least one of: hardware configurations, software configurations, regional regulation configurations, and media configurations.

According to some embodiments, the service provider-specific configuration routine includes at least one of the following settings and hardware/software configurations and reconfiguration patches: UE settings, network settings, sound settings, media settings, messaging application settings, user-agent string and profile settings, language settings, application configurations, location positioning configurations, shared library settings, resource settings, software settings in kernel/native layer, various drivers for hardware components, accessibility settings, video technology settings, status bar settings, developer options, alarm clock/timer settings, power on/off settings, contacts settings, AM/FM radio settings, music sharing settings, Bluetooth settings, USB settings, WiFi settings, and email settings.

In some embodiments, the region-specific configuration routine includes an area-specific configuration routine and a country-specific configuration routine. The area-specific configuration routine is associated with an area. The area is associated with at least one country. The area-specific configuration routine is associated with configuration instructions applied to UEs operating in the area. The country-specific configuration routine is associated with a country, the country is one of the at least one country associated with the area. The country-specific configuration routine is associated with configuration instructions applied to UEs operating in the country. The service provider-specific configuration routine is associated with a service provider, the service provider is one of the at least one service provider associated with the region. The service provider-specific configuration routine is associated with configuration instructions applied to UEs operated by a service provider.

In various embodiments, the target set of configuration routines includes at least one of the area-specific configuration routine, the country-specific configuration routine, and the service provider-specific configuration routine.

According to some embodiments, the region-specific configuration routine and the service provider-specific configuration routine are stored together in a same repository of a memory device associated with the UE. The region-specific configuration routine and the service provider-specific configuration routine are stored in a hidden partition of a memory device associated with the UE.

In various embodiments, the target set of configuration routines is selected, and the at least one of setting of the UE is configured in response to a first triggering event. The first triggering event is one of: the receiving of the SIM, a subsidy lock based on the SIM, factory build, factory test command, user input, and command received via a network.

In some embodiments, the method described further includes: selecting, by the UE, a secondary target set of configuration routines from the plurality of configuration routines, the secondary target set of configuration routines comprising at least one of the plurality of configuration routines, and configuring the at least one setting of the UE based, at least in part, on the secondary target set of configuration routines. The selecting the secondary target set of configuration routines and configuration based on the secondary target set of configuration routines are executed in response to a second triggering event, the second triggering event being one of: the receiving of the SIM, a subsidy lock based on the SIM, factory build, factory test command, user input, and command received via a network.

In some embodiments, the first triggering event and the second triggering event are different triggering events.

In various embodiments, the configuring based on the target set of configuration routines occurs prior in time than the configuration based on the secondary target set of configuration routines.

According to some embodiments, the method described further includes defining a plurality of package value levels. The target set of configuration routines comprises at least one configuration routine corresponding to one of the plurality of package value levels.

In some embodiments, the selecting of the target set of configuration routines includes matching one of the at least one parameter value stored on each of the at least one SIM with the target set of configuration routines.

In some embodiments, the at least one SIM is a plurality of SIMs.

According to some embodiments, the selecting of the target set of configuration routines includes determining a plurality of matched sets of configuration routines. Each of the plurality of the matched sets of configuration routines is matched to one of the plurality of SIMs.

In some embodiments, the selecting of the target set of configuration routines further includes selecting, by the UE, the target set of configuration routines from the matched sets of configuration routines.

In some embodiments, the target set of configuration routines is selected from the matched sets of configuration routines based, at least in part, on user input.

In various embodiments, the target set of configuration routines is selected from the matched sets of configuration routines automatically based, at least in part, on the location of the UE.

In some embodiments, the determining a plurality of matched sets of configuration routines includes determining a plurality of indicators. Each of the plurality of indicators is determined based on the at least one parameter value stored on each of the plurality of SIMs.

In some embodiments, the at least parameter value includes values of one or more of: a Mobile Network Code, a Mobile Country Code, a Service Provider Name, and a Group Identifier.

In some embodiments, an apparatus for configure a user equipment (UE), the apparatus includes a memory device, a processor, the processor configured to: store a plurality of configuration routines; receive at least one subscriber identity module (SIM); a target set of configuration routines from the plurality of configuration routines based, at least in part, on at least one parameter value stored on each of the at least one SIM, the target set of configuration routines comprising at least one of the plurality of configuration routines; and configure at least one setting of the UE based, at least in part, on the target set of configuration routines.

In some embodiments, the at least one SIM is a plurality of SIMs. In various embodiments, the processor being configured to select the target set of configuration routines includes the processor is configured to determine a plurality of matched sets of configuration routines. Each of the plurality of the matched sets of configuration routines is matched to one of the plurality of SIMs.

In some embodiments, the processor being configured to select the target set of configuration routines further includes the processor is configured to select the target set of configuration routines from the matched sets of configuration routines.

In various embodiments, the target set of configuration routines is selected from the matched sets of configuration routines based, at least in part, on user input.

In some embodiments, the target set of configuration routines is selected from the matched sets of configuration routines automatically based, at least in part, on the location of the UE.

In some embodiments, the processor being configured to determine a plurality of matched sets of configuration routines includes the processor is configured to determine a plurality of indicators. Each of the plurality of indicators is determined based on the at least one parameter value stored on each of the plurality of SIMs.

According to some embodiments, an apparatus for configuring a user equipment (UE), the apparatus including: means for storing a plurality of configuration routines; means for receiving at least one subscriber identity module (SIM); means for selecting a target set of configuration routines from the plurality of configuration routines based, at least in part, on at least one parameter value stored on each of the at least one SIM, the target set of configuration routines comprising at least one of the plurality of configuration routines; and means for configuring at least one setting of the UE based, at least in part, on the target set of configuration routines.

In various embodiments, computer-readable medium containing program instructions that, when executed, causes a processor to store a plurality of configuration routines; receive at least one subscriber identity module (SIM); select a target set of configuration routines from the plurality of configuration routines based, at least in part, on at least one parameter value stored on each of the at least one SIM, the target set of configuration routines comprising at least one of the plurality of configuration routines; and configure at least one setting of the UE based, at least in part, on the target set of configuration routines.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

Figure 1:
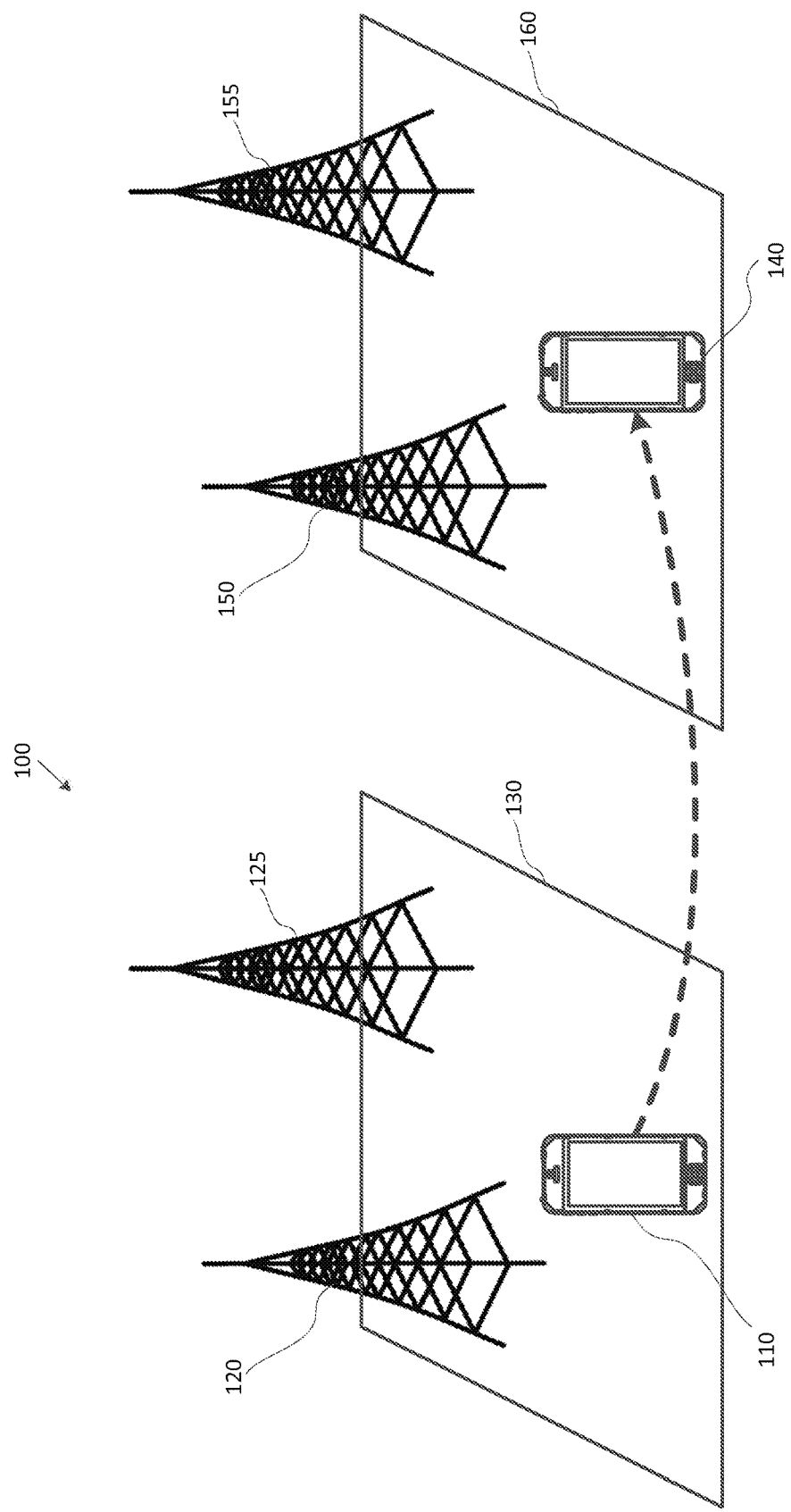
FIG. 1 is a schematic diagram illustrating an example of a device configuration system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the invention or the claim.

Some modern communication devices, referred to herein as user equipment (UE) may contain one or more subscriber identity modules (SIMs) that provide users of the UEs with access to one or multiple different mobile networks (e.g., both cellular and non-cellular networks), supported by radio access technologies (RATs). The UE may also be referred to as a mobile station (MS). Examples of UE include, but are not limited to, mobile phones, laptop computers, smart phones, and other mobile communication devices of the like that are configured to connect to one or more RATs. Examples of RATs may include, but are not limited to, Global Standard for Mobile (GSM), Code Division Multiple Access (CDMA), CDMA2000, Time Division-Code Division Multiple Access (TDCDMA), Time Division-Synchronous Code Division Multiple Access (TDSCDMA), Wideband-Code Division Multiple Access (WCDMA), Time Division Multiple Access (TDMA), Frequency Division Multiple Access (FDMA), Long-Term Evolution (LTE), wireless fidelity (WiFi), various 3G standards, various 4G standards, Voice over LTE (VoLTE), Simultaneous GSM and LTE (SGLTE), Simultaneous Voice and LTE (SVLTE), Circuit Switched Fall Back (CSFB), frequency modulation (FM), Bluetooth (BT), near field communication device (NFC), and the like.

Embodiments described herein relate to both single-SIM and multi-SIM UEs. A UE that includes a plurality of SIMs and connects to two or more different RATs using a same set of RF resources (e.g., radio-frequency (RF) transceivers-) is a multi-SIM-multi-standby (MSMS) communication device. In one example, the MSMS communication device may be a dual-SIM-dual-standby (DSDS) communication device, which may include two SIM cards/subscriptions that may both be active on standby, but one is deactivated when the other one is in use. In another example, the MSMS communication device may be a triple-SIM-triple-standby (TSTS) communication device, which includes three SIM cards/subscriptions that may all be active on standby, where two may be deactivated when the third one is in use. In other examples, the MSMS communication device may be other suitable multi-SIM communication devices, with, for example, four or more SIMs, such that when one is in use, the others may be deactivated.

Further, a UE that includes a plurality of SIMs and connects to two or more different mobile networks using two or more different sets of RF resources is termed a multi-SIM-multi-active (MSMA) communication device. An example MSMA communication device is a dual-SIM-dual-active (DSDA) communication device, which includes two SIM cards/subscriptions, each associated with a different RAT, where both SIMs may remain active at any given time. In another example, the MSMA device may be a triple-SIM-triple-active (TSTA) communication device, which includes three SIM cards/subscriptions, each associated with a different RAT, where all three SIMs may remain active at any given time. In other examples, the MSMA communication device may be other suitable multi-SIM communication devices, with, for example, four or more SIMs, such that all SIMs are active at any given time.

With a multi-mode SIM, a plurality of modes are enabled by one SIM, such that each mode may correspond to a different RAT. A UE may include on or more multi-mode SIMs. The UE may be a MSMS communication device (such as, but not limited to, a DSDS or a TSTS communication device), a MSMA communication device (e.g., a DSDA, TSTA communication device, or the like), or a multi-mode device.

As used herein, UE refers to one of a cellular telephone, smart phone, personal or mobile multi-media player, personal data assistant, laptop computer, personal computers, tablet computer, smart book, palm-top computer, wireless electronic mail receiver, multimedia Internet-enabled cellular telephone, wireless gaming controller, and similar personal electronic device that include one or more SIMs, a programmable processor, memory, and circuitry for connecting to one or more mobile communication networks (simultaneously or sequentially). Various embodiments may be useful in mobile communication devices, such as smart phones, and such devices are referred to in the descriptions of various embodiments. However, the embodiments may be useful in any electronic device, such as a DSDS, a TSTS, a DSDA, a TSTA communication device or other suitable multi-SIM, multi-mode devices, that may individually maintain one or more subscriptions that utilize one or a plurality of different set of RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the UE to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

Embodiments described herein relate to a complete device configuration (of hardware, network resources, media, and/or applications) of the UE at build and/or runtime based on parameters stored on one or more SIMs received by the UE. In particular embodiments described herein, the UE is enabled to undergo a complete configuration or reconfiguration based on data stored on a selected one of a plurality of SIMs (all of which may be simultaneously received by the UE). Each SIM contains a set of parameters for which the UE may be configured, where the set of parameters correspond to a predefined region (e.g., country or other geographic area), service provider, service, or any combination thereof. When the UE is configured according to the set of parameters from a SIM, the UE may be operable in the predefined region (e.g., country or other geographic area), or with the service provider or service, or a combination thereof, associated with that SIM. A SIM may refer to any physical or virtual token including or storing therein parameters such as the ones described in a hierarchical manner (e.g., device, area, country, service provider, and/or the like in that or other suitable hierarchical order). The parameters and additional fields provided by the SIM may be used to trigger the configuration of the UE as described.

Embodiments described herein may enable the OEMs to design, implement, and manufacture a single device (or device model) configuration with uniform hardware and software to roll out for use in multiple (some or all) regions, service providers and services. Embodiments described herein allow the OEM to manufacture devices with the same hardware/software design for multiple regions, service providers and services. In other words, the OEM may enable multiple different customizations for a UE (or a model of UEs), where each different customization corresponds to a different respective hardware and/or software configuration that allows the UE to operate in or with one or more predefined regions, service providers and services. The multiple customizations may be operator market customizations or open market customizations. For example, the UE may be provided hardware customizations and corresponding software customizations to accommodate multiple regions/service providers. The software customizations may be stored externally or internally with respect to the UE. The software customizations may be modularly stored and read (e.g., according to region, country, brand, service provider, service and the like). Accordingly, OEM rollout may be substantially expedited, and various resources may be saved, given that the OEMs need not deploy multiple (or as many) variants of a same device to accommodate many different regions, service providers, services or the like.

FIG. 1 is a schematic diagram illustrating an example of a device configuration system 100 shown in accordance with various embodiments. The device configuration system 100 includes a UE 110, a first base station 120, and a second base station 125. The first base station 120 and the second base station 125 may each include at least one antenna group or transmission station located at different positions within a first region 130, such that each antenna group or transmission station is configured to transmit and/or receive signals. The first base station 120 and the second base station 125 may each include one or more processors, modulators, multiplexers, demodulators, demultiplexers, antennas, and the like for transmitting and/or receiving signals and performing other tasks as described herein. In some embodiments, the first base station 120 and the second base station 125 may communicate with (provide service for) the UE 110 and may be an access point, Node B, evolved Node B (eNode B or eNB), base transceiver station (BTS), or the like.

The first region 130 may be a region associated with the first base station 120 and the second base station 125, such that the UE 110, when located within the first region 130, may acquire service from the first base station 120 and/or the second base station 125. In other words, the UE 110 may camp on the network(s) provided by the first base station 120 and/or the second base station 125. The UE 110 may receive signals from and transmit signals to the first base station 120 and/or the second base station 125 via the network(s) provided by the first base station 120 and/or the second base station.

In some embodiments, the first base station 120 and the second base station 125 represent different base stations that may be transmitting signals from a same service provider within the first region 130 (i.e., both the first base stations 120 and the second base station 125 may provide service offered by a same service provider). In other embodiments, the first base station 120 and the second base station 125 each represent a different service provider (i.e., the first base station 120 and the second base station 125 may provide services from different service providers). As used herein, service provider may refer to various mobile service providers and mobile virtual network operators (MVNO). By way of illustrating with a non-limiting example, the first region 130 may be a country (e.g., China), and each of the first base station 130 and the second base station 125 may represent different service providers associated with China. For example, the first base station 120 and the second base station 125 may both represent different base stations from the same service provider (e.g., China Mobile). In other examples, the first base station 120 and the second base station 125 may each represent a different service provider (e.g., one of China Mobile, China Unicom, China Telecom, and the like). One service provider may be different from another service provider when they employ different network configuration standards (i.e., the service providers may require different configuration of the UE).

At least some configurations of the UE 110 may be service provider-specific, such that these configurations may vary with respect to different service providers within (or, in some cases, not within) the same region (e.g., the first region 130 or a second region 160). In some cases, some or all configurations of the UE 110 may be the same for two or more different service providers.

The UE 110 may be configured to receive service from one or more service providers by virtue of the multi-SIM configuration, such that when a SIM corresponding to one service provider is received, the UE 110 may gain capability of receiving service from that service provider. Accordingly, as the UE 110 may receive a plurality of SIMs (each of which may correspond to a different service provider), the UE 110 may be enabled to receive service from a plurality of service providers. In particular embodiments, the UE 110 is a multi-mode SIM, where a single SIM may enable a plurality of services provided by different service providers.

The device configuration system 100 may further include one or more additional base stations, represented as a third base station 150 and a fourth base station 155 in a second region 160. The third base station 150 and the fourth base station 155 may be at different locations within the second region 160. The third base station 150 and the fourth base station 155 may be similar to the first base station 120 and the second base station 125 as described or other suitable base stations. The second region 160 may be a different (or overlapping) geographic region relative to the first region 130. In addition, the relationship between the third base station 150, the fourth base station 155, and the second region 160 may be similar to the relationship between the first base station 120, the second base station 125, and the first region 130.

In some embodiments, the first region 130 and the second region 160 may represent different regions, where the first region 130 may support (operate with) or allow a set of network configuration standards or protocols that may be different (partially or entirely) from the configuration standards or protocols supported or allowed by the second region 160. The first region 130 and the second region 160 may each represent a continent, a country, a region, a state, a province, a city, or other geographic regions having definable boundaries throughout which some or all of the configuration standards or protocols are uniform. In other words, at least a portion of the configuration for the UE 110 may be region-specific, such that all UEs configured for a region may be configured in the same manner with respect to at least a portion of the network configurations. Such region-specific configurations may be modem configuration standards, application/software configuration standards, hardware drivers, communication protocol, bandwidths, or the like, or any combination thereof. The region-specific configurations may be determined by government agencies of the region, service providers of the region, or other suitable entities.

In some embodiments, the first region 130 and the second region 160 may be entirely different from one another such that no portions of the first region 130 and the second region 160 may overlap. In other embodiments, at least a portion of the first region 130 and the second region 160 may overlap at least partially. The overlapping portion may support configuration standards associated with both the first region 130 and the second region 160. Alternatively, the overlapping portion may support configuration standards associated with one of the first region 130 and the second region 160.

In some embodiments, the UE 110 may be moved from an initial position to a moved position 140 (e.g., by virtue of being carried by the user of the UE 110). The moved position 140 may be within the same region as the region (initial region) associated with the initial position. Alternatively, the moved position 140 may be within a region (e.g., the second region 160) different from the region associated with the initial region (e.g., the first region 130). When the UE 110 moves to another region that is different from the initial region (e.g., when the UE 110 moves from the first region 130 to the second region 160), the UE 110 may be reconfigured to conform to the service provider-specific and/or the region-specific configurations associated with the new region (e.g., the second region 160). On the other hand, if the UE 110 is not moved to a different region, the configuration standard for the UE 110 may not altered. In some cases, the UE 110 may, for various reasons, request to be associated with a new service provider, within the same region or for another region. In such cases, the UE 110 may be reconfigured to conform with the configuration standards of the new service provider.

In particular embodiments, the region may include two levels of abstracts: a country and an area. An area (e.g., Asia) may include on or more countries (e.g., China, Japan, Korea, India, and/or the like). For example, a first area may include at least the first region 130, which may be China, and the second region 160, which may be India.

Accordingly, each UE 110 may include a complete set configurations, which may include region-specific (e.g., area-specific and/or country-specific) configurations, service provider-specific configurations, and/or other suitable configurations. Each type of configuration may configure one or more attributes of the UE 110 (e.g., by definite the hardware and software behavior of the UE 110) before or while the UE 110 is used by the user. Such configuration may be set by entities in the manufacturing chain, entities in the distribution chain, and/or the user.

It should be appreciated by one of ordinary skill in the art that the embodiments described may be applicable to non-cellular wireless communication technologies and devices. As such, networks provided by the first base station 120, the second base station 125, the third base station 150, and the fourth base station 155 may be non-cellular wireless networks (e.g., mesh networks). Accordingly, automatic and/or manual configuration of devices may include configurations (both hardware and software) for non-cellular wireless communication technologies and devices. Medical, automotive, small cells, and other non-cellular wireless devices may be configured in this manner consistent with this disclosure.

The device configuration shown in FIG. 1 are for illustrative purposes and, in further embodiments, the device configuration system 100 may include two or more UEs, more or less base stations, and/or more or less regions. Each additional UE may be a UE such as, but not limited to, the UE 110 as described. Each of the additional base stations may be a base station such as, but not limited to, the first base station 120, the second base station 125, the third base station 150, or the fourth base station 155, as described. Also, each of the additional regions may be a region such as, but not limited to, the first region 130 or the second region 160 as described. The relationship between additional UE(s), additional base station(s), and additional region(s) may be a relationship such as, but not limited to, the relationships between the UE 110, the first region 130, the second region 160, the first base station 120, the second base station 125, the third base station 150, and the fourth base station 155.

Figure 2:
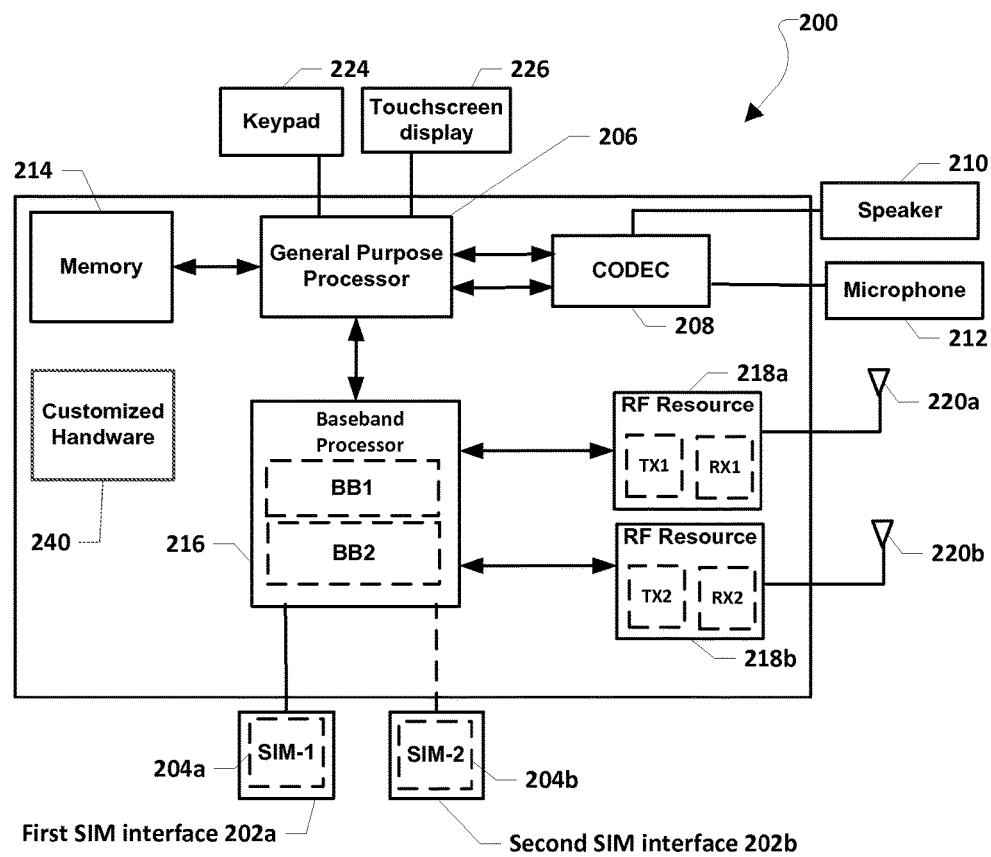
FIG. 2 is a block diagram showing an example of an UE suitable for implementing various embodiments.

FIG. 2 is a block diagram showing an example of a UE 200 suitable for implementing various embodiments. Referring to FIGS. 1-2, the UE 200 is a device such as, but not limited to, the UE 110. The UE 200 includes a first SIM interface 202a, which receives a first identity module SIM-1 204a that is associated with a first subscription provided by a first service provider. The UE 200 also includes a second SIM interface 202b, which receives a second identity module SIM-2 204b that is associated with a second subscription provided by a second service provider. The first subscription and the second subscription may be a same subscription (e.g., a same service provider), or the first subscription and the second subscription may be different subscriptions (e.g., different service providers). In some embodiments, the first service provider and the second service provider may be a same service provider. In other embodiments, the first service provider and the second service provider may be different service providers.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE 200, and thus need not be a different or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The UE 200 includes at least one controller, such as a general purpose processor 206, which may be coupled to a coder/decoder (CODEC) 208. The CODEC 208 may in turn be coupled to a speaker 210 and a microphone 212. The general purpose processor 206 is coupled to at least one memory 214. The memory 214 may be a non-transitory processor-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general purpose processor 206 and the memory 214 are each be coupled to at least one baseband processor 216. Each SIM in the UE 200 (e.g., the SIM-1 202a and the SIM-2 202b) may be associated with a baseband-RF resource chain. A baseband-RF resource chain may include the baseband processor 216, which may perform baseband/modem functions for communications on at least one SIM, and may include one or more amplifiers and radios, referred to generally herein as RF resources 218a, 218b. In some embodiments, baseband-RF resource chains share the baseband processor 216 (i.e., a single device that performs baseband/modem functions for all SIMs on the UE 200). In other embodiments, each baseband-RF resource chain include physically or logically different baseband processors (e.g., BB1, BB2).

The RF resources 218a, 218b may each be transceivers that perform transmit/receive functions for the associated SIM of the UE 200. The RF resources 218a, 218b may include different transmit and receive circuitry, or may include a transceiver that combines transmitter and receiver functions. The RF resources 218a, 218b are each be coupled to a wireless antenna (e.g., a first wireless antenna 220a or a second wireless antenna 220b). The RF resources 218a, 218b may also be coupled to the baseband processor 216.

In some embodiments, the general purpose processor 206, the memory 214, the baseband processor 216, and the RF resources 218a, 218b may be included in the UE 200 as a system-on-chip. In some embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the UE 200 may include, but are not limited to, a keypad 224, a touchscreen display 226, and the microphone 212.

In some embodiments, the keypad 224, the touchscreen display 226, the microphone 212, or a combination thereof, perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the UE 200 to enable communication between them, as is known in the art.

In some embodiments (not shown), the UE 200 may include, among other things, additional SIM cards, SIM interfaces, a plurality of RF resources associated with the additional SIM cards, and additional antennae for connecting to additional mobile networks.

In particular embodiments, the UE 200 includes customized hardware 240. The customized hardware 240 may be hardware (e.g., one or more hardware components) installed on the UE 200 by the OEM to accommodate hardware requirements for different regions (e.g., areas and/or countries) and/or different service providers. Each region and/or service provider may require different hardware components for conforming with standards and market needs with respect to the region. For example, processors (e.g., the general purpose processor 206 and/or the baseband processor 216) for the same model of UE (e.g., the UE 200) released in two or more different regions (or provided by two or more different service providers) may be different as the processing needs may vary from market to market given market demand and market standards. In another example, RF resources and antennae (e.g., the RF resources 218a, 218b) for the same model of UE (e.g., the UE 200) released in two or more different regions (or provided by two or more different service providers) may be different given that the communication standards may vary from market to market.

The customized hardware 240 may include two or more different hardware components for the same type of hardware component. For example, the UE 200 may include two or more types of processors (e.g., two or more different baseband processors), each of which may be associated with one or more regions and/or service providers. In another example, the UE 200 may include two or more types of RF resources (e.g., two or more different RF resources), each of which may be associated with one or more regions and/or service providers. Different hardware components may refer to hardware components having different models. Different hardware components may also refer to hardware components having a same model and configured differently.

In particular embodiments, the customized hardware 240 includes hardware components customized for all regions, service providers and services for which the UE 200 is intended to be rolled out. For example, the customized hardware 240 may include hardware components accommodating all or at least a majority of regions and/or service providers in the world for a global launch of a UE (e.g., the UE 200). In another example, the customized hardware 240 may include hardware components accommodating all or at least a majority of regions and/or service providers given a defined boundary (or several selected regions/service providers) for a partial launch of a UE (e.g., the UE 200).

In some embodiments, the customized hardware 240 includes one or more sets of hardware for the UE 200, including, but not limited to, SIM interface (e.g., the SIM interfaces 204a, 204b), coder/decoder (e.g., the CODEC 208), processor (e.g., the general purpose processor 206), speaker (e.g., the speaker 210), microphone (e.g., the microphone 212), memory (e.g., the memory 214), modem processor (e.g., the baseband processor 216), RF resources (e.g., the RF resources 218a, 218b), antennae (e.g., the first wireless antenna 220a or the second wireless antenna 220b), input interface (e.g., the keypad 224), output display (e.g., the touchscreen display 226), management unit, or the like, or any combination thereof.

Figure 3:
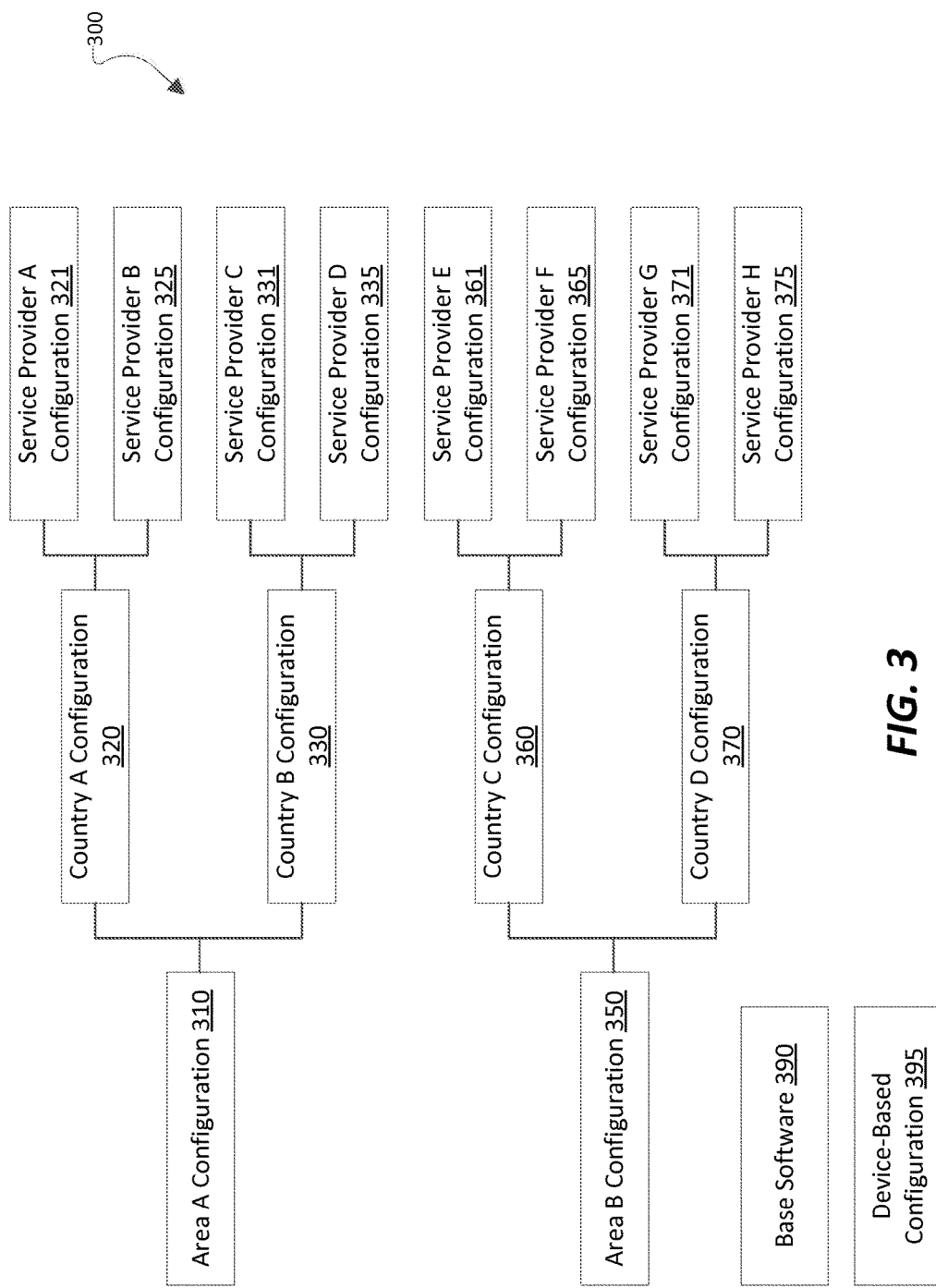
FIG. 3 is a block diagram illustrating an example of a configuration storage suitable for implementing various embodiments.

FIG. 3 is a block diagram illustrating an example of a configuration storage 300 suitable for implementing various embodiments. Referring to FIGS. 1-3, at least a portion of contents included the configuration storage 300 may be stored in a memory device in the UE 200 (e.g., the memory 214, a hidden partition within the memory 214 or within other suitable memory device, and/or the like). In some embodiments, the user of the UE 200 may be restricted from accessing information stored in the hidden partition. The general purpose processor 206 of UE 200 may access information (e.g., the configuration routines and/or base software 390) in the hidden partition and configure the UE 200 based on the configuration routines. In some embodiments, at least a portion of contents included in the configuration storage 300 may be stored in a memory device external to the UE 200 and is physically (or wirelessly) connectable to the UE 200 for transferring data (e.g., a dongle or other universal serial bus (USB) memory devices, an external secure digital (SD) card, and/or other external memory devices connectable to the UE 200).

In some embodiments, at least a portion of contents included in the configuration storage 300 is stored at a remote device and/or memory device, where the content stored in the configuration storage 300 may be downloaded or otherwise copied to the UE 200 through a network (e.g., any suitable wired or wireless network, and/or the like). In particular embodiments, the UE 200 may determine the contents (all or a portion of the contents in the configuration storage 300) to be loaded onto the UE 200. The portion of the contents may refer to particular configuration routines or sets of configuration routines. Then, the UE 200 may be configured to download the requested content. This is because, in some embodiments described herein, the UE 200 may correspond various configuration routines (e.g., the UE 200 may include configuration routines for configuring the UE 200 for all potential area, country, and service provider), and some (e.g., one) of the various configuration routines may be used to configure the UE 200 with. Accordingly, by storing at least some contents of the configuration storage 300 remotely and downloading specific contents as needed (e.g., as matched to the desired configuration of the UE 200), resources of the UE 200 can be conserved.

In further embodiments, a portion of the contents included in the configuration storage 300 is stored/transfer by a first method, such as (but not limited to) one of the methods described herein (e.g., internal memory device, physically-connectable external memory device, remote server, or the like) while a different portion of the contents included in the configuration storage 300 is stored/transferred by a different (second) method, such as (but not limited to) another one of the methods described herein. For example, base software 390 may be stored in an internal memory device (e.g., the memory 214) while various region-specific configurations (e.g., area-specific configurations, country-specific configurations, and/or the like), service provider configurations, and/or the like may be stored in a physically connectable external memory device and/or in a remote server.

In some embodiments, at least of portion of the contents is preloaded (e.g., stored in the configuration storage 300 before the UE 200 is switched on for the first time, before the UE 200 is first used by a user, before the out-of-box experience, and/or the like). For example, at least a portion of the contents of the configuration storage 300 may be provided to the UE 200 before or simultaneous to receiving of any SIMs to the UE 200. In some cases, all contents of the configuration storage 300 (which may include the base software 390 and/or one or more configuration routines) may be provided to the UE 200 before the UE 200 is switched on for the first time. In other cases, a portion (e.g., the base software 390 and, sometimes, one or more configuration routines) of the contents may be preloaded to the UE 200 while a different portion of the contents (and/or additional contents of the same nature that adds/modifies existing content, e.g., in the form of a patch) of the configuration storage 300 may be loaded, downloaded, or otherwise stored after the UE 200 is switched on for the first time. The contents may be stored in the configuration storage 300 by the OEM, the retailers, the users, and/or other designated personnel.

In some embodiments, the configuration storage 300 includes various configuration routines, each of which may be executed by the general purpose processor 206 to configure one or more aspects of the UE 200. In other words, the configuration routines may configure hardware components or other device behavior of the UE 200 in order for the UE 200 to be operable, functional, or otherwise compatible with respect to the region(s) and/or service provider(s) that the UE 200 is to be configured for. The configuration routines selected to configure the UE 200 may be a set of configurations (e.g., the target set of configurations) containing configuration routines that (alone or in combination) may be characterized as "complete" or "full-stack" configuration. This may mean that, the configuration routines, when executed by the general purpose processor 206, may configure hardware components (both network-related and other hardware components), media, applications, and/or the like. The hardware components may be, for example, the customized hardware 240 as described.

Accordingly, the configuration storage 300 may include hardware configuration routines corresponding to at least the SIM interface (e.g., the SIM interfaces 204a, 204b), the coder/decoder (e.g., the CODEC 208), the processor (e.g., the general purpose processor 206), the speaker (e.g., the speaker 210), the microphone (e.g., the microphone 212), the memory (e.g., the memory 214), the modem processor (e.g., the baseband processor 216), the RF resources (e.g., the RF resources 218a, 218b), antennae (e.g., the first wireless antenna 220a or the second wireless antenna 220b), the input interface (e.g., the keypad 224), output display (e.g., the touchscreen display 226), management unit, and the like.

For example, the configuration routines may include (but is not limited to) UE settings (e.g., model name, brand, SIM switching settings, UE build nomenclature settings, extensible markup language settings, application initialization settings, network settings such as access point name settings, application database settings, browser settings, software versioning options, device name settings, specific absorption rate settings, reboot settings, SIM-triggered installation of special regional package, install location selection, headset settings, and/or the like), network settings (cell broadcast settings, data roaming settings, network identity and time zone settings, emergency call settings, mobile data settings, network mode option settings, and/or the like), sound settings (ringtone settings, alarm tone settings, short message service tone settings, keypad tone settings, music settings, maximum sound settings, low battery tone, and/or the like), media settings (e.g., boot media settings, alarm media settings, notifications media settings, user interface media settings, wallpaper and screen settings, and/or the like), date and time settings (e.g., time zone settings, time and data format settings, and/or the like), messaging application settings, user-agent string and profile settings, language settings (e.g., default input method settings, additional input method settings, default system language settings, other system language settings, and/or the like), application configurations (e.g., language package, preloaded content/applications, third-party applications, framework resources, and/or the like), location positioning configurations (e.g., wireless network position settings, global positioning system settings, assisted global positioning system settings, and/or the like) shared library settings (e.g., shared libraries associated with one or more package file format), resource settings (e.g., framework resources, libraries, and/or the like), software settings in kernel/native layer for languages such as C and/or C++, various drivers for hardware components (e.g., camera drivers, user interface drivers, recording device drivers, framework drivers, and/or the like), accessibility settings (e.g., auto rotation settings, TalkBack service settings, auto-correction settings, and/or the like), video/audio technology settings, status bar settings (e.g., operator name display settings, signal icon customization settings, "no network" icon settings, and/or the like), developer options (e.g., USB debugging options, stay awake settings, fake position/mock location settings, and/or the like), alarm clock/timer settings (e.g., ringing duration settings, snooze duration settings, silent-during-call-received settings, silent-during-meeting settings, and/or the like), power on/off settings, contacts settings, AM/FM radio settings, music sharing settings, Bluetooth settings, USB settings, WiFi settings, email settings, and/or the like.

In some embodiments, some configuration routines are area-specific (i.e., these configuration routines may be commonly shared by all UEs operating within the bounds of the area). For example, the configuration storage 300 may include a plurality of area-specific configuration routines, such as, but not limited to Area A Configuration 310, Area B Configuration 350, and/or other additional area-specific configuration routines (not shown). At least a portion of each of the area-specific configuration routines may configure the UE 200 differently when executed. In particular embodiments, no portions of one area-specific configuration routines (e.g., Area A Configuration 310) may be the same as any portions of another area-specific configuration routine (e.g., Area B Configuration 350).

In some embodiments, two or more area-specific configuration routines (e.g., the Area A Configuration 310 and the Area B Configuration 350) are associated with different areas such that no portions of the areas are overlapping. In some embodiments, the area-specific configuration routines (e.g., the Area A Configuration 310 and the Area B Configuration 350, and/or the like) may be associated with areas where at least a portion of the areas may overlap.

The area-specific configuration routines may include configurations such as, but not limited to, configurations stored within the configuration storage 300. Examples of area-specific configurations may include, but are not limited to, hardware/software configurations (RF bands, LTE operational/fall back methods, data frame, operator, drivers, joint regulatory configurations, processor value-added application settings, language settings, network resources configurations), media configurations, other area-specific configurations, and/or the like.

In some embodiments, the configuration storage 300 includes one or more country-specific configurations (i.e., such configuration routines may be commonly shared by all UEs operating within the country), such as, but not limited to Country A Configuration 320, Country B Configuration 330, Country C Configuration 360, Country D Configuration 370, and/or other additional country-specific configurations (not shown). At least a portion of the country-specific configuration routines (e.g., the Country A Configuration 320, the Country B Configuration 330, the Country C Configuration 360, the Country D Configuration 370, and/or the like) may be different configuration routines that configures the UE 200 differently. In particular embodiments, at least some attributes of the UE 200 configured by a country-specific configuration routine (e.g., the Country A Configuration 320) are different from attributes configured by an area-specific configuration routine (e.g., Area B Configuration 350).

The country-specific configuration routines may include configurations such as, but not limited to, configurations stored within the configuration storage 300. Examples of country-specific configuration routines may include, but are not limited to, hardware/software configurations (data frame, operator, drivers, processor value-added application settings, language settings, network resources configurations), national regulatory configurations (e.g. public land mobile network settings), media configurations, other country-specific configurations, and/or the like.

In some embodiments, the configuration routines are classified based on the associated service providers for which the UE 200 is to be configured. Some configuration routines may be service provider-specific (i.e., these configuration routines may be commonly shared by all UEs using a same service provider). For example, the configuration storage 300 may include a plurality of service provider-specific configuration routines, such as, but not limited to Service Provider A Configuration 321, Service Provider B Configuration 325, Service Provider C Configuration 331, Service Provider D Configuration 335, Service Provider E Configuration 361, Service Provider F Configuration 365, Service Provider G Configuration 371, Service Provider H Configuration 375, and additional service provider-specific configuration routines (not shown). At least a portion of a service provider-specific configuration routine (e.g., the Service Provider A Configuration 321) may be different and/or unique from a corresponding portion of another service provider-specific configuration routine (e.g., the Service Provider B Configuration 325).

The service provider-specific configuration routines may include configuration such as, but not limited to, configurations stored within the configuration storage 300. Examples of service provider-specific configurations may include, but are not limited to the UE settings, the network settings, the sound settings, the media settings, the messaging application settings, the user-agent string and profile settings, the language settings, the application configurations, the location positioning configurations, the shared library settings, the resource settings, the software settings in kernel/native layer, the various drivers for hardware components, accessibility settings, video/audio technology settings, the status bar settings, the developer options, the alarm clock/timer settings, the power on/off settings, the contacts settings, the AM/FM radio settings, the music sharing settings, the Bluetooth settings, the USB settings, the WiFi settings, the email settings, and/or the like.

In various embodiments, the configuration routines are classified based on the device type or model of the UE 200. Some configuration routines may be service device-specific (i.e., these configuration routines may be commonly shared by all UEs of a model, maker, year, and/or the like). For example, the configuration storage 300 may include at least one device-specific configuration routines, such as, but not limited to Device-Based Configuration 395. At least a portion of a device-specific configuration routine (e.g., the Device-Based Configuration 395) may be different and/or unique from a corresponding portion of another device-specific configuration routine.

The device-specific configuration routine may include configuration such as, but not limited to, configurations stored within the configuration storage 300. Examples of device-specific configurations may include, but are not limited to device hardware settings, device-specific hardware driver configurations, the UE settings, the network settings, the sound settings, the media settings, the messaging application settings, the user-agent string and profile settings, the language settings, the application configurations, the location positioning configurations, the shared library settings, the resource settings, the software settings in kernel/native layer, the various drivers for hardware components, accessibility settings, the video technology settings, the status bar settings, the developer options, the alarm clock/timer settings, the power on/off settings, the contacts settings, the AM/FM radio settings, the music sharing settings, the Bluetooth settings, the USB settings, the WiFi settings, the email settings, and/or the like.

In various embodiments, the configuration routines included in the configuration storage 300 are classified or arranged to present a modular or hierarchical format. Arranging and storing the configuration routines in modular format can reduce cost for the OEM to provide voluminous software for accommodating all markets in which the UE 200 may be released for, as well as reducing runtime and resources when the UE 200 is to locate specific configuration routines at configuration. The configuration routines may be classified based on the region (e.g., area, country, and/or the like) and/or service providers.

For example, some configuration routines included in the configuration storage 300 may be classified as area-specific (i.e., the area-specific configuration routine include configurations that are common to all UEs configured for use in the area, and at least some of these configurations may be unique as compared to configurations of another area-specific configuration routine). Some configuration routines included in the configuration storage 300 may be classified as country-specific (i.e., the country-specific configuration routine include configurations that are common to all UEs configured for use in the country, and at least some of these configurations may be unique as compared to configurations of another country-specific configuration routine). In some embodiments, an area associated with an area-specific configuration routine includes one or more countries (or regions). Each of the one or more countries may be associated with a country-specific configuration routine. In some embodiments, some configuration routines included in the configuration storage 300 are classified as service provider-specific (i.e., the service provider-specific configuration routine include configurations that are common to all UEs configured for use for a service provider, and at least some of these configurations may be unique as compared to configurations of another service provider-specific configuration routine). In some embodiments, a country associated with a country-specific configuration routine is associated with one or more service providers. Each of the one or more service providers may be associated with a service provider-specific configuration routine.

In some embodiments, an area associated with an area-specific configuration routine corresponds to a region encompassing at least the first region 130 and the second region 160. A first country associated with a country-specific configuration routine may correspond to the first region 130, and a second country associated with another country-specific configuration routine may correspond to the second region 160. A service provider associated with a service provider-specific configuration routine may correspond to each of the first base station 120, the second base station 125, the third base station 150, and the fourth base station 155. Illustrating with a nonlimiting example, an area-specific configuration routine may correspond to Asia, and two country-specific configuration routines may correspond to China and India. Each of China and India may have one or more services providers. A different service provider-specific configuration routine may associate with each of China Mobile, China Unicom, and China Telecom, all of which are Chinese service providers. In addition, a different service provider-specific configuration routine may associate with each of Micromax, Spice, and Lava/Xolo, all of which are Indian OEMs.

Accordingly, the configuration storage 300 may include one or more area-specific configuration routines, each of which may correspond to one or more country-specific configuration routines. Each of the one or more country-specific configuration routines, in turn, may correspond to one or more service provider-specific configuration routines. The classified configuration routines may be grouped together and stored in one or more repositories.

For example, a country-specific configuration routine (e.g., Country A Configuration 320) may be grouped together with its associated service provider-specific configuration routines (e.g., Service Provider A Configuration 321 and Service Provider B Configuration 325) to form a country repository. In another example, an area-specific configuration routine (e.g., Area A Configuration 310) may be grouped together with its associated country-specific configuration routines (e.g., Country A Configuration 320, Country B Configuration 330) as well as the associated service provider-specific configuration routines (e.g., Service Provider A Configuration 321, Service Provider B Configuration 325, Service Provider C Configuration 331, Service Provider D Configuration 335) to form an area repository.

Software and configuration in a same repository (e.g., a country repository or an area repository) may be stored together in a same partition, directory, or secure area (e.g., a hidden partition) of a memory device (e.g., the memory 214 of the UE 200, physically-connectable external memory devices, remote devices, and/or the like). In other words, different repositories may be stored in different partitions, directories, or secure areas of a same memory devices. Different repositories may be stored in different memory devices as well. For example, each country repository containing at least one country-specific configuration routine and at least one service provider-specific configuration routine may be stored in a same partition that is different from a partition storing another country repository. Multiple country repositories may then be stored together with each other and an area-specific configuration routine to form an area repository, and stored in partition including all sub-partitions, each of which may include a country repository. In addition, a partition storing the base software 390 may different from partitions storing any area repository and/or country repository. In further or alternative embodiments, the base software 390 may be stored in a different memory device from any configuration routines.

In particular embodiments, the base software 390 refers to configuration routines that may be common to all (or most) UEs operating in an area, country, and/or the like using services provided by any service provider. The base software 390, when executed by the general purpose processor 206 of the UE 200, may configure the UE 200 to be able to perform basic functions, such as, but not limited to, powering on, displaying information (e.g., configuration routine selection) on the touchscreen display 226, accepting user input from keypad 224 and/or the touchscreen display 226, configuring various hardware components (e.g., the general purpose processor 206, the memory 214, the keypad 224, the touchscreen display 226, the first SIM interface 202*a*, second SIM interface 202*b*, and/or the like) of the UE 200 for basic functions, and/or the like. In particular, additional basic functions may include: reading and processing information included in received SIMs, matching a set of configuration routines with each SIM inserted, selecting one of the configuration routines, displaying configuration information on the touchscreen display 226, and configuring the UE. In other words, the base software 390 enable the configuration process as described herein (e.g., FIGS. 6-7). Accordingly, the base software 390 may refer to a default configuration that enables the UE 200 to perform basic functions before other features of the UE 200 are configured and/or before the UE 200 becomes fully functional.

The configuration routines (e.g., the area-specific configuration routines, the country-specific configuration routines, and/or the service provider-specific configuration routines) as well as the base software 390 may each be associated with a unique indicator. Such unique indicator may be stored with associated the configuration routine (e.g., in a same partition and/or memory device). The indicators may also be provided in a configuration match table, with which the configuration routine is matched to a configuration identifier as described.

Additional content or data corresponding to one or more configuration routines and the base software 390 may be provided after the original contents of the configuration storage 300 has been initially provided. Such additional content or data may be patches that add to and/or modify existing configuration routines. Patches may be downloaded to the UE 200 from a remote server via a network (either wired or wireless), or from a physically-connectable external memory device. After a patch is downloaded, the patch (and/or a patch identifier identifying the patch) may be stored together (e.g., in the same partition and/or memory device) with the content to which the patch alters or adds (e.g., a patch that alters a portion of the Service Provider A Configuration 321 may be stored with the Service Provider A Configuration 321). The patch may be applied with the corresponding configuration routines (e.g., at build-time, run-time, and the like). Alternatively, the patch may be applied at time after the corresponding configuration routines have been executed. A patch may be applied for any configuration routines within the configuration storage 300, including, but not limited to, camera configurations, user interface configuration, framework configurations, drivers, and/or the like. Patches may form one or more patch-based repositories. The patch-based repositories may be stored in a hidden partition and/or in a remote server (e.g., the cloud) and accessible through the network.

In some embodiments, designated entities such as the OEM may have the capability to add value-added services to the configuration routines with respect to one or more particular sets of configuration routines or each individual configuration routine. For example, the UE 200 may be configured to receive updates of the existing configuration routines or value-added services configuration routines before or after the UE 200 is configured. In other words, additional packets in the form of patches and/or the like may be added to or improves the configuration routines stored in the configuration storage 300 (and in their respective repositories). The additional packets can also be applied by various other means, including a PC-based software program.

The configuration routines stored in the configuration storage 300 may be used to configured the UE 200 in response to one or more triggering events. In some embodiments, the triggering event may occur during or at a build-ing-time of the UE 200. In other embodiments, the triggering event may occur during runtime.

In various embodiments, at least a portion of the configuration routines are executed or otherwise applied during or at build-time, the build-time being a period of time in which the software (e.g., the base software 390 and the various configuration routines) may be compiled. Build-time may also represent a time period in which the software of the UE 200 has not yet been executed. The configuration routines may executed automatically (e.g., by the general purpose processor 206 of the UE 200 in response to triggers described) and/or manually (e.g., by designated personnel from the OEM, and/or the like). In some embodiments, at least a portion of all configuration routines stored in the configuration storage 300 is executed to configure the UE 200 in response to the end of build-time (e.g., when all or a substantial amount of software other than the base software 390 has been compiled). In further embodiments, the base software 390 is executed first to configure the UE 200 in response to the end of build-time. At least a portion of the configuration routines may then be executed to configure the UE 200 in response to the completion of configuring the UE 200 based on the base software 390. Alternatively, the configuration/reconfiguration process may be initiated in response to a build command, which is a command for initiating factory build of the UE 200. One or more aspects of the UE 200 may be configured simultaneous to factory build.

Each configuration routine stored in the configuration storage 300 may be marked with a flag indicating whether the configuration routine is to be executed during or in response to the end of the build-time. The general purpose processor 206 of the UE 200 may first identify the configuration routines marked for build-time execution, and then configure the UE 200 in during or in response to the end of the build-time based on the identified configuration routines. The configuration routines to be executed during or in response to the end of the build-time may be marked manually by suitable personnel (e.g., OEM personnel). Alternatively, the figuration routines to be executed during or in response to the end of the build-time may be marked automatically (e.g., by the general purpose processor 206 of the UE 200) based on suitable algorithms.

In various embodiments, at least a portion of the configuration routines are executed or otherwise applied during runtime, the runtime being a period of time in which the software (e.g., the base software 390 and the various configuration routines) may be executed. Runtime may also represent a time period following the UE 200 being switched on for the first time (e.g., after or during the out-of-box experience). For example, runtime triggers may include: factory command, SIM, personnel selection, and/or the like.

In particular embodiments, activating of a factory test command at runtime initiates a configuration (or reconfiguration process), such that a configuration routine of the plurality of configuration routines stored in the configuration storage 300 of the UE 200 may be selected and executed. For example, a factory test command element may be provided to the UE 200 as a button, knob, dial, switch, user interactive element, and/or other suitable element selectable by the user of a designated personnel to perform a configuration or reconfiguration of the UE 200. In alternative embodiments, the factory test command element is deployed as codes executable by the general purpose processor 206 of the UE 200. The configuration and the reconfiguration of the UE 200 based on the factory test command may be initiated automatically according to the codes. The factory test command element may receive indicator and/or configuration identifier associated with the configuration routine to be executed. Then, the factor test command element may initiate the configuring and the reconfiguring of the UE 200 based on the configuration routine. This trigger may also be characterized as a master reset and other similar test commands.

The configuration routine to be executed in response to receiving a factory test command may be selected manually by a user and/or suitable personnel. Alternatively, the configuration routine to be executed in response to receiving a factory test command may be selected automatically (e.g., by the general purpose processor 206 of the UE 200) based on suitable algorithms. The factory test command element may include computer executable instructions such that, when executed by the general purpose processor 206 of the UE 200, may delete configuration routines not selected.

In various embodiments, a SIM (e.g., the insertion of the SIM) triggers configuration and/or reconfiguration of the UE 200. In some embodiments, the receiving of one or more SIMs by the UE 200 is detected by the general purpose processor 206 of the UE 200. The SIM interfaces, such as the first SIM interface 202a and the second SIM interface 202b, have been previously unoccupied by any SIM; the one or more SIMs inserted may be the first SIM(s) to be ever inserted into the UE 200. In response to the one or more SIMs being received by the UE 200, the configuration process for the UE 200 may be initiated. First during the configuration process, the configuration routines may be selected (e.g., based on the parameter values stored on each of the one or more SIMs) as described.

In some embodiments, the configuration/reconfiguration of the UE 200 may be based on or in response to SIM/subsidy lock. On configuring the UE 200 on initial SIM insert, the service provider may require application and instantiation of SIM lock codes and application of service-provider based subsidy lock. The initial SIM insert refers to the first SIM being inserted into the UE 200. The ability to set SIM and subsidy lock for a multi-SIM insert scenario is accounted for here. The UE 200 may be configured to accept SIMs corresponding to only some area, country, service provider, and/or the like. In other words, the UE 200 may detect one or more parameters on the SIM and determines that the SIM is unacceptable because it is not associated with an approved area, country, service provider, and/or the like. The UE 200 may be SIM/subsidy locked upon the insertion of the first SIM (e.g., no other SIMs have been inserted previously to the particular UE 200). The configuration/reconfiguration process as described may be initiated in response to the first SIM being inserted and/or the SIM/subsidy lock being applied. Subsequent SIMs that are SIM/subsidy locked out may not trigger the configuration/reconfiguration process.

In some embodiments, at least a part of the configuration/reconfiguration process of the UE 200 may be based on or in response to cloud command (e.g., a triggering command from another node on the network). The cloud command may be received by the UE 200 with additions and/or modifications (e.g., in the form of patches) to existing configuration routines stored on the UE 200. After the patches (if there is any) have been applied, the UE 200 may be configured to initiate the configuration/reconfiguration process. The target set of configuration routines may be selected by or contained within the cloud command. In other embodiments, the target set of configuration routines may be selected by user input and other means as described herein.

Whereas the UE 200 has already been configured (triggered by any methods described), the inserting of at least one new SIM (when no SIM has been received) or additional SIM (when one or more SIMs are received in the UE 200) initiates a reconfiguration process of the UE 200. In particular embodiments, the UE 200 detects at least one new and/or additional SIM with the general purpose processor 206 of the UE 200. In response to detecting the at least one new and/or additional SIM, at least one configuration routines stored in the configuration storage 300 is selected and executed to reconfigure the UE 200 (e.g., based on parameter values stored on each of the at least one SIM) as described.

In additional embodiments, the configuration process and the reconfiguration process is initiated based on the UE 200 (e.g., through the general purpose processor 206) reading one or more values of parameters stored on the SIM received. The parameters including the MCC, MNC, SPN, GID, and/or the like. In other words, the configuration and/or reconfiguration process may be initiated in response to the UE 200 having read and processed the values of the parameters (e.g., in response to the indicator being determined based on the values of the parameters). The configuration/reconfiguration process may include selecting a configuration routine, configuring the UE 200 based on the configuration routine, and/or the like.

In various embodiments, the user interface (e.g., the touchscreen display 226) of the UE 200 generates a selection screen in which a designated personnel may trigger manually configuration and/or reconfiguration of the UE 200. This triggering event may be referred to as the personnel selection trigger. For example, the touchscreen display 226 may request input from a designated personnel concerning whether a configuration and/or reconfiguration is desired. In alternative embodiments, the touchscreen 226 displays selectable configuration options, each of which relates to a corresponding configuration routine stored in the configuration storage. The touchscreen display 226 and/or the keypad 224 may receive an input from the designated personnel and configure the UE 200 based on one or more configuration routines (e.g., the configuration routines may be selected by the designated personnel). In some embodiments, this trigger mechanism is for testing purposes (e.g., this triggering mechanism may be disabled for product usage by end users). The designated personnel may be personnel from the OEM and/or service centers.

The UE 200 may be rendered to enter an "un-configured" state (e.g., manually based on user input and/or automatically based on suitable algorithms). In the un-configured state, the UE 200 reverts to a state where it may only be capable of performing basic functions (functions for configuring the UE 200). In the un-configured state, the UE 200 is not configured by any configuration routines (or previous configurations were reverted back) other than configurations of the base software 390. The UE 200 may then be triggered to initiate a configuration/reconfiguration process in response to receiving a SIM in the manner as described.

In some embodiments, the configuration routines included in the configuration storage 300 are divided into at least two portions. The configuration routines included in the first portion may be triggered in a different manner (e.g., having different triggers) than the configuration routines of the second portion. In some examples, execution of some configuration routines may be triggered during or at the completion of build-time while other configuration routines may be triggered by factory command, SIM insertion, and/or personnel selection. The manner that each configuration routine may be triggered may be specified by a flag stored with or otherwise pointing to the corresponding configuration routine. The trigger for each configuration routine may be manually determined by a designated personnel. Alternatively, the trigger for each configuration routine may be selected automatically based on suitable algorithms. In various embodiments, execution of a patch associated with a configuration routine and the configuration routine is triggered by a same triggering event. For example, the configuration routines included in the base software 390 may be triggered at build-time, and other configurations may be triggered to be executed at runtime (e.g., based on SIM insertion, factory command, and/or personnel selection).

Figure 4:
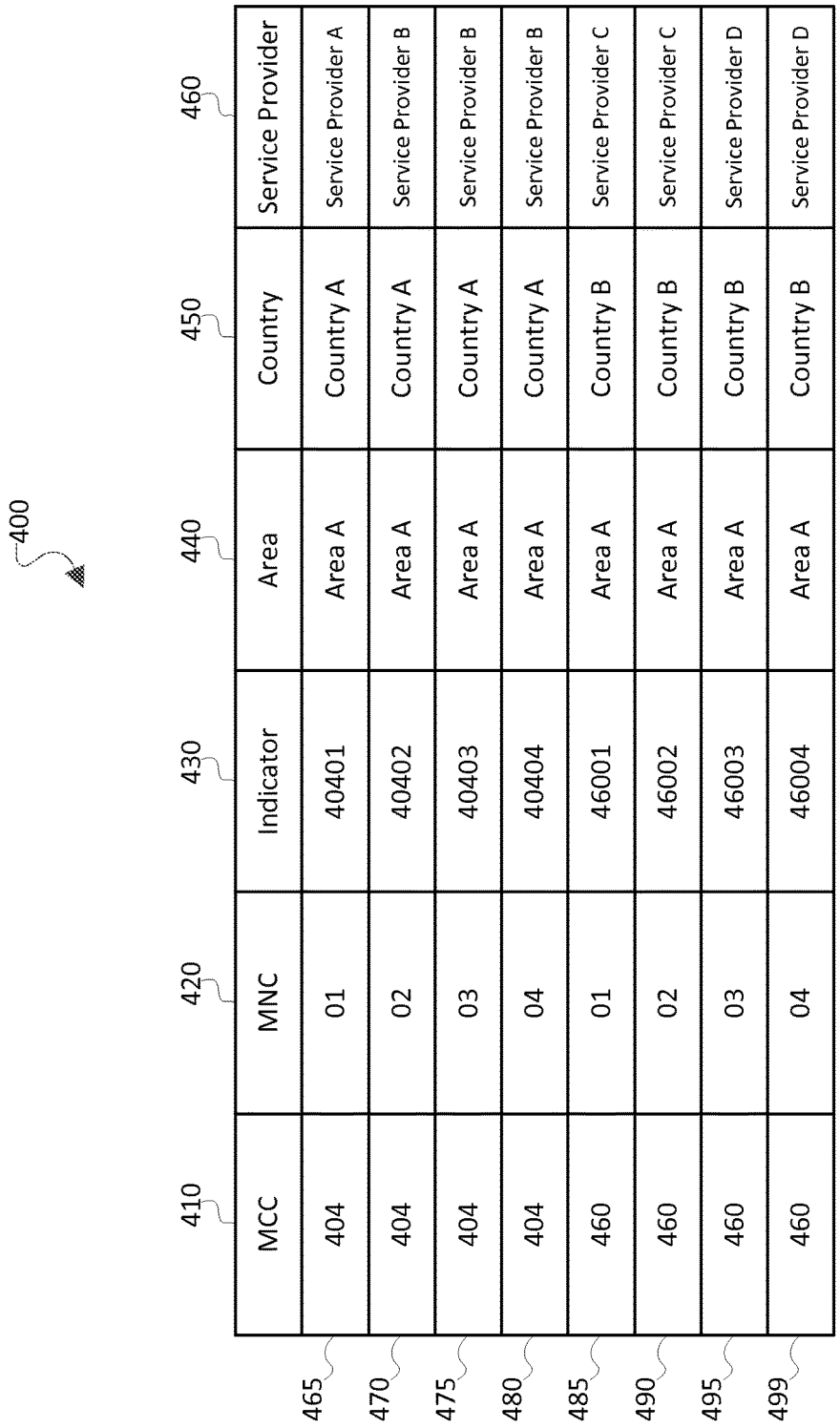
FIG. 4 illustrates an example of an indicator table containing examples of indicators associated with configuration routines according to some embodiments.

FIG. 4 illustrates an example of an indicator table 400 containing examples of indicators associated with configuration routines stored within the configuration storage 300 (FIG. 3). Referring to FIGS. 1-4, a unique indicator may be created for each configuration routine based on one or more parameters such as Mobile Network Code (MNC), Mobile Country Code (MCC), Service Provider Name (SPN), Group Identifier (GID), and other suitable parameters of the like. A MCC may represent a country and/or an area in which the UE 200 may be operating. The MNC may represent a mobile service provider associated with the country and/or area represented by the MCC. The MNC/MCC combination may represent a unique service provider for the UE 200. The SPN may identify a service provider for the UE 200. The GID (e.g., GID1 and GID2) may identify mobile networks associated with the UE 200. In some embodiments, the values for these parameters may be stored on a SIM or other suitable devices.

The indicator table 400 shows examples of indicators (e.g., as shown in the indicator column 430) created from two or more parameters. In this example, a first parameter (e.g., the MCC) in a first parameter column 410 and a second parameter in a second parameter column 420 (e.g., the MNC) form the basis of the indicators of the indicator column 430. The first parameter (e.g., the MCC) may correspond to an area and/or a country, the area and/or the country (and/or a combination thereof) may at least partially identify a set of configuration routines configuration routine. For example, the MCC "404" (e.g., in the first row 465 and the first parameter column 410) may correspond to "Area A" (e.g., Asia, as shown in the first row 465 and an area column 440) and "Country A" (e.g., India, as shown in the first row 465 and a country column 450). In another example, the MCC "460" (e.g., in the first row 465 and the first parameter column 410) may correspond to "Area A" (e.g., Asia, as shown in the fifth row 485 and an area column 440) and "Country B" (e.g., China, as shown in the fifth row 485 and a country column 450). The second parameter (e.g., the MNC) may correspond to a service provider. In one example, the MNC "01" (e.g., in the first row 465 and the second parameter column 420) may correspond to "Service Provider A" (e.g., in the first row 465 and a service provider column 460). As described, the area, country, and service provider combination may correspond to at least one set of configuration routines to configure the UE 200 with. It should be appreciated by one having ordinary skill in the art that the indicator 400 is shown for illustrative purposes, and that additional parameters (e.g., SPN, GID, and/or the like) may be used in creating the indicators. In some embodiments, at least two values for the same parameter may be the same (e.g., the MCC "404" in a first row 465, a second row 470, a third row 475, and a fourth row 480 may be the same; the MCC "460" in a fifth row 485, a sixth row 490, a seventh row 495, and an eighth row 499 may be the same; the MNC "01" in the first row 465 and the fifth row 485 may be the same).

In some embodiments, an indicator is an alphanumeric text (e.g., a number, a text string, a combination thereof, and/or the like) that uniquely identifies a set of configuration routines. The UE 200 may be configured based on a set of target configuration routines, each set of target configuration routines may include an area-specific configuration routine, a country-specific configuration routine, a service provider-specific configuration routine, and a device-specific configuration routine. In some embodiments, both an indicator and at least a set of parameter values correspond to a same configuration routine. In particular embodiments, the indicator may be a concatenation of the various parameters, where a value of the first parameter may be a first part of the indicator, and a value of the second parameter may be a second part of the indicator. For example, a MCC value "404" (e.g., in the first row 465 and the first parameter column 410) may be concatenated with a MNC value "01" (e.g., in the first row 465 and the second parameter column 420) to form the indicator "40401" (e.g., in the first row 465 and the indicator column 430).

In various embodiments, two different indicators (e.g., indicators "40402," "40403," and "40404" as shown in the second row 470 and the indicator column 430, the third row 475 and the indicator column 430, and the fourth row 480 and the indicator column 430) represent a same configuration routine. Such different indicators may each represent a different network that a single service provider operating in the area and country may be offering. The configuration routines corresponding to these different networks may be the same.

In other embodiments, different networks operated by a same service provider in the area and country are represented by the same indicator, and additional elements may be concatenated to the indicator to distinguish the different networks. For example, additional element (e.g., "01," "02," "03," and/or the like) may be concatenated to the indicator "40402" to form secondary indicators "4040201," "4040202," "4040203," and/or the like. Each of the secondary indicators may be used to represent a same configuration.

Figure 5:
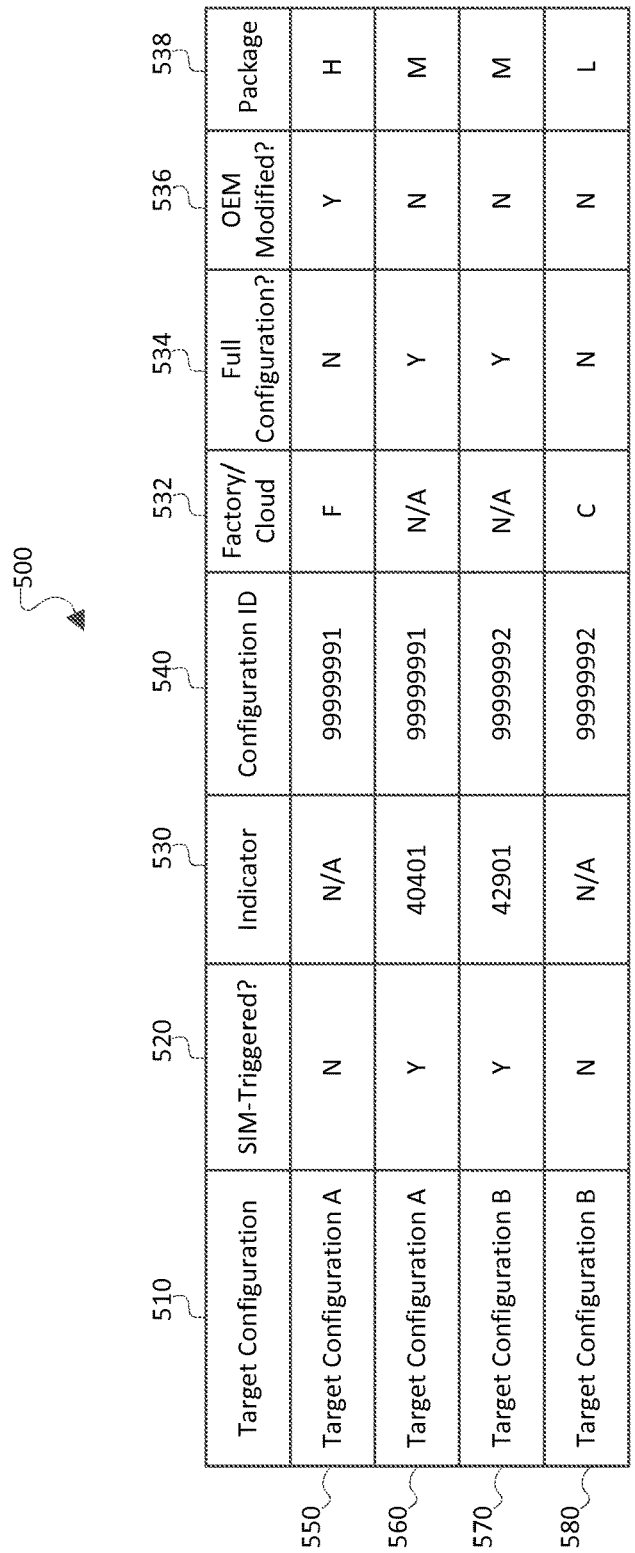
FIG. 5 illustrates an example of a mapping table for selecting a configuration routine according to various embodiments.

FIG. 5 illustrates an example of a mapping table 500 for selecting a configuration routine to configure the UE 200 (FIG. 1). Referring to FIGS. 1-5, the mapping table 500 may be provided to the UE 200 in an internal memory device (e.g., the memory 214), physically-connectable external memory device, remote server, and/or the like. The mapping table 500 may be provided in a hidden partition and may only be accessed by the general purpose processor 206 of the UE 200. In some embodiments, personnel from the OEM or other designated entities may alter and/or add to the mapping table 500. The mapping table 500 may be stored content that may be read and/or used by the general purpose processor 206 of the UE 200. In some embodiments, the mapping table 500 may be provided at build-time. In other embodiments, the mapping table 500 may be provided after build-time (e.g., at runtime, before the configuration routine is to be initiated). For example, the mapping table 500 may be loaded or downloaded from a remote server (e.g., through a wired and/or wireless network) and/or an external physically connectable memory device.

The mapping table 500 may include a plurality of entries (e.g., a first entry 550, a second entry 560, a third entry 570, a fourth entry 580, and/or the like). Each entry may be associated with a set of configuration routines, a trigger flag for representing a triggering event that triggers execution of the configuration routine, an indicator corresponding to one or more parameters on a SIM, a configuration identifier that identifies the set of configuration routines, and the like.

In some embodiments, the mapping table 500 includes a target configuration column 510 for listing a set of configuration routines. For example, a set of configuration routines for complete configuration or reconfiguration of the UE 200 may include area-specific configurations, country-specific configurations, service provider-specific configurations, and/or device-specific configuration routine. In some embodiments, the target configuration column 510 is arranged according to one or more of the area, the country, the service provider, the device, different codes corresponding to each or a combination thereof, and/or the like. Such arranging and indexing of the configuration routines can allow shorter search time for one or more particular set of configuration routines. The content listed in the target configuration column may be an alphanumeric string (e.g., a text string, a numeric string, a combination thereof, and/or the like).

In various embodiments, the mapping table 500 includes a trigger column 520 for denoting the triggering event for a particular set of configuration routines. For each associated set of configuration routines (e.g., each entry) in the target configuration column 510, a corresponding trigger flag may be provided in the trigger column 520. The trigger flag may be two or more values, each value may denote a different trigger for the configuration. For example, a first value may correspond to a build-time trigger, a second value may correspond to a SIM trigger, a third value may correspond to a user-input trigger, and a fourth value may correspond to a factor command trigger.

In particular embodiments as shown in the mapping table 500, the trigger column 520 includes trigger flags having one or more values, each of which may indicate whether a particular configuration may be triggered by one or more SIMs. For example, the first value (e.g., "Y" for "yes") may indicate that the configuration routine is triggered by SIM (e.g., the inserting of the SIM) and the second value (e.g., "N" for "no") may indicate that the configuration routine is not triggered by SIM(s).

In addition, the mapping table 500 may include an indicator column 530 for listing indicators as described with respect to indicator table 400. In some embodiments, the set of configuration routines are associated with an indicator when it is triggered based on one or more SIMs. A set of configuration routines that may be executed based on triggers (or no triggers) other than the SIM(s) trigger may have a null indicator value (e.g., "0," "NA," and/or the like).

The mapping table 500 may include a configuration identifier column 540 for receiving configuration identifiers, each of which may identify a unique set of configuration routines. The configuration identifiers may be assigned to each set of configuration routines by designed personnel at build-time and/or at runtime before the initiation of the configuration process. The configuration identifiers may also be assigned automatically, based on suitable algorithms. The configuration identifiers may be an alphanumeric text that does not conflict with a text space (e.g., having a possibility of confusion such as having the same number of numerals) of the indicators. In other words, the configuration identifiers may be an alphanumeric text that may appear to be substantially different in format from the alphanumeric text of the indicator. In some examples, a forward string (e.g., filler texts such as "9999999," which may be same for at least a portion of configuration identifiers) may lead the alphanumeric text of a configuration identifier. An identity string may be concatenated to the end of the forward string.

In some embodiments, two or more identical configuration identifiers are listed in the configuration identifier column 540, each of the identical configuration identifiers may correspond to a same targeted configuration shown in the targeted configuration column 510. For example, the first entry 550 and the second entry 560 maybe associated with a same set of configuration routines (e.g., "Target Configuration A," which may be titled "Vodafone-India" to denote the service provider and the area/country) which may be identified by the same configuration ID (e.g., "99999991") for both entries. In another example, the third entry 570 and the second entry 580 maybe associated with a same set of configuration routines (e.g., "Target Configuration B," which may be titled "Vodafone-Nepal" to denote the service provider and the area/country) which may be identified by the same configuration ID (e.g., "99999992") for both entries. The different between the first entry 550 and the second entry 560 may be that the values of the trigger flags and the indicators (which may correspond to the values of the trigger flags) may be different. Additional identifiers may be concatenated to the configuration ID to indicate whether the set of configuration (or a portion thereof) associated with the configuration ID is SIM-triggered.

In further embodiments, the mapping table 500 may include a factory/cloud indication column 532 for storing factory/cloud configuration indicators. For each associated set of configuration routines (e.g., each entry) in the target configuration column 510, a corresponding factory/cloud indicator may be provided in the factory/cloud indication column 532. The factory/cloud indicator may be two or more values, each value may denote whether at least a portion of the set of configuration routines may be triggered during factory build or cloud download. In one example, at least a portion of a set of configuration routines may be triggered during factory build (e.g., for the first entry 550), as denoted by the value "F" in the factory/cloud indication column 532. At least a portion of a set of configuration routines may be triggered for cloud download (e.g., for the fourth entry 580), as denoted by the value "C" in the factory/cloud indication column 532.

In general, according to some embodiments, configurations that may be triggered at factory build and/or cloud may be available when the UE 200 may not be configured in response to detection of receiving at least one SIM. Accordingly, at least a portion of a set of configuration routines may not be triggered during factory build/cloud when it has been triggered by the receiving of the SIM(s). For example, the second entry 560 and the third entry 570 both show "N/A," which is a value indicating that the set of configuration routine is neither triggered during factory build nor cloud. This is because for both the second entry 560 and the third entry 570, the sets of configuration routines are triggered by receiving the SIM(s). In other embodiments, a portion of a set of configuration routines may be triggered by receiving the SIM(s) while another portion of the same set of configuration routines may be triggered in response to either factory build or cloud. According, some configuration routines of a set of configuration routines may be indicated to be both SIM-triggered and factory/cloud triggered.

In still further embodiments, the mapping table 500 may include a full/partial indication column 534 for storing full/partial configuration indicators. For each associated set of configuration routines (e.g., each entry) in the target configuration column 510, a corresponding full/partial indicator may be provided in the full/partial indication column 534. The full/partial indicator may be two or more values, each value may denote whether at least a portion of the set of configuration routines may be a full configuration or a partial configuration. A full configuration refers to all aspects of the UE 200 may be configured per the full configuration. A partial configuration refers to some but not all aspects of the UE 200 may be configured. Other aspects of the UE 200 may be configured subsequently and/or previously in response to another type of trigger. In one example, a set of configuration routines may be full configurations set (e.g., the second entry 560, and the third entry 570), as denoted by the value "Y" in the full/partial indication column 534. Another set of configuration routines may be a partial set (e.g., the first entry 550 and the fourth entry 580), as denoted by the value "N" in the full/partial indication column 534. Complementary configuration sets may be received in different entries. All complementary configuration sets may be partial sets as indicated by the full/partial indication column 534. A full configuration of the UE 200 may be achieved by executing two or more complementary configuration sets (i.e., one alone does not allow the UE 200 to be fully configured, such as in the cases of configuration patches applied sequentially by downloading content from the cloud). Complementary configuration sets may be triggered with different triggering events, may be received from different one of factory and cloud, may be applied at different times, and/or the like.

In still further embodiments, the mapping table 500 may include a modification indication column 536 for indicating whether the configurations within the corresponding set of configurations may be added to or modified by the OEM, vendors, service entities, the user, or other suitable entities. For each associated set of configuration routines (e.g., each entry) in the target configuration column 510, a corresponding modification indicator may be provided in the modification indication column 536. The modification indicator may be two or more values, each value may denote whether the configuration routines may be modified or added to subsequent to initial (i.e., first configuration of the UE 200 for use) configuration of the UE 200. In other embodiments, the modification indicator may include a separate value for modification before initial configuration (but after the corresponding configuration has already been stored in the configuration storage 300) and modification after initial configuration. In one example, a set of configuration routines may be modifiable (or already modified) by the user of the UE 200, the OEM, or other suitable entities (e.g., the first entry 550), as denoted by the value "Y" in the modification indication column 536. Another set of configuration routines may not be modifiable (or already modified) by suitable entities (e.g., the second entry 560, the third entry 570, and the fourth entry 580), as denoted by the value "N" in the modification indication column 536.

Accordingly, an OEM or other suitable entity may modify existing configuration routines post-build (e.g., with software such as a programming tool executable by a general/specific-purpose computer). The OEM is accordingly enabled with editing configurations and setting up algorithms corresponding to each existing configurations. A modifiable flag may correspond to each set of configuration routines or each configuration routine. The modifiable flag may indicate whether the corresponding set of configuration routines or the configuration routine can be modified and/or added to. A modified flag may correspond to each set of configuration routines or each configuration routine. The modified flag may indicate whether the corresponding set of configuration routines or the configuration routine has already been modified and/or added to. One or both of the modifiable and modified flag may be associated with one or more of the set of configuration routines or a configuration routine.

In still further embodiments, the mapping table 500 may include a package indication column 538 for indicating the configuration routines corresponding to one or more packages. The OEM may desire to have different types of customization in configuration of a same model of UE 200 (e.g., for selling at different price ranges). Thus, configuration routines may be package-specific. The configuration routines may different based on package levels. For each associated set of configuration routines (e.g., each entry) in the target configuration column 510, a corresponding package indicator may be provided in the package indication column 538. Two or more package (value) levels may be predefined by the OEM and/or other suitable personnel. A higher value package value level may correspond to more or better device drivers, applications, enabled hardware, value-added applications, and/or the like. A package indicator may be associated with each package value level for identification purposes. In one example, a set of configuration routines may correspond to a high value package level (e.g., the first entry 550), as denoted by the value "H" in the package indication column 538. Another set of configuration routines may correspond to a medium package value level (e.g., the second entry 560 and the third entry 570), as denoted by the value "M" in the package indication column 538. Yet another set of configuration routines may correspond to a low package value level (e.g., the fourth entry 580), as denoted by the value "L" in the package indication column 538.

An identifier/indicator may be associated with each of the factory/cloud configuration indicators (shown in the factory/cloud indication column 532), the full/partial configuration indicator (shown in the full/partial indication column 534), the modification indicator (as shown in the modification indication column 536). Such identifiers/indicators may be added to the configuration identifiers as shown in the configuration identifier column 540. For example, an identifier (e.g., "2F") may indicate that the set of configuration routines is factory triggered. Another identifier (e.g., "3F") may indicate that the set of configuration routines is a full configuration. Yet another identifier (e.g., "4M") may indicate that the set of configuration routines is modifiable. In further embodiments, an identifier may be associated with SIM-triggered configurations. For example, identifier ("ST") may denote that the set of configuration routines is SIM-triggered and identifier ("NS") may denote that the set of configuration routines is not SIM-triggered. Yet another identifier (e.g., "H") may indicate that the set of configuration routines corresponds to a high package level.

Accordingly, the identifier/indicator for at least one of the factory/cloud configuration, full/partial configuration, and modification may be concatenated with configuration identifier as described (including a target set identifier, a SIM-trigger identifier, a forward string, and/or the like) to form a secondary configuration identifier. The secondary configuration identifier may be configured as a configuration identifier such as, but not limited to, as described. A secondary configuration identifier in the preceding example may be "99999991NS2F3F4MH," denoting Target Configuration A is factory triggered, full configuration, modifiable, high package level, and not SIM-triggered.

It should be appreciated by one having ordinary skill in the art that the sample identifiers and indicators are for demonstrative purposes, and other suitable alphanumeric characters, parameters, values, pointers, and/or the like may be used. In addition, the indicator column 530 of the mapping table 500 may include or list fewer or additional indicators than shown.

Figures 6, 7:
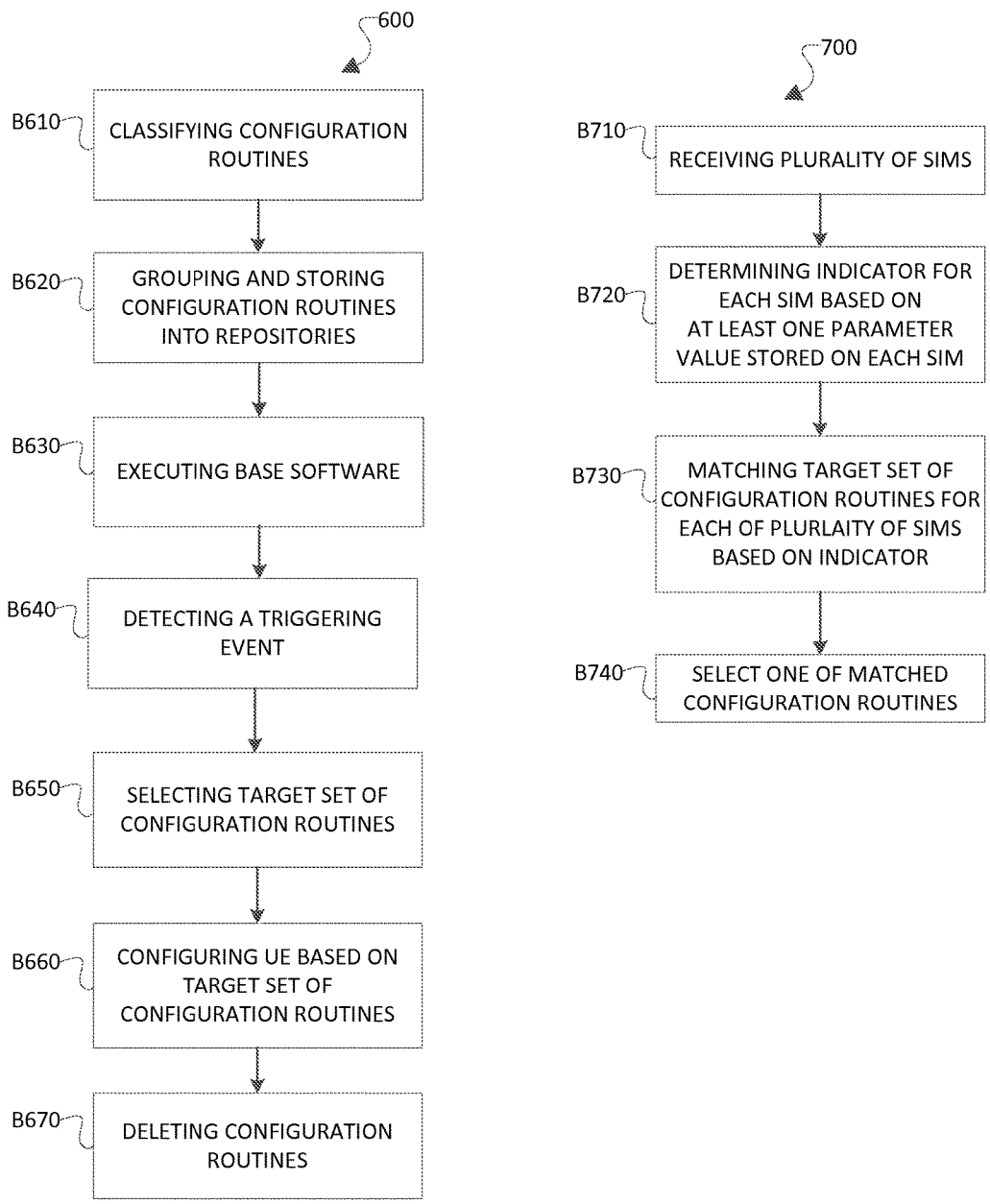
FIG. 6 is a process flowchart illustrating an example of a configuration process according to various embodiments.
FIG. 7 is a process flowchart illustrating an example of a selection process according to various embodiments.

FIG. 6 is a process flowchart illustrating an example of a configuration process 600 according to various embodiments. With reference to FIGS. 1-6, the configuration process 600 may refer to a process by which a complete configuration of the UE 200 may be performed. First at block B610, a processor, such as the general purpose processor 206 (or other suitable component) of the UE 200, is configured to classify the configuration routines. In some embodiments, a plurality of configuration routines are provided to the configuration storage 300 of the UE 200 (e.g., in the internal memory device, in the hidden partition, in the physically connectable external device, in the remote service, and/or the like), in the manner described. The configuration routines may be classified based on the region and/or service provider associated with the UE 200 (e.g., a configuration routine may be area-specific, country-specific, service provider-specific, or the like). The target set of configuration routines may be a set of configuration routines executed to configure the UE 200. The set of configuration routines may include at least one area-specific configuration routine, at least one country-specific configuration routine, at least one service provider-specific configuration routine, at least one device-specific configuration routine, and/or the like.

Next at block B620, the general purpose processor 206 of the UE 200 is configured to group and store the classified configuration routines into various repositories. As described, classified configurations may be stored together into at least one country repository, at least one area repository, and/or the like.

Next at block B630, the general purpose processor 206 of the UE 200 is configured to execute some base software (e.g., the base software 390 stored in the configuration storage 300). The base software 390 may include preliminary configuration routines for configuring the UE 200 to perform basic functions (e.g., some or most features of the UE 200 may be yet to be configured for following the executing of the base software 390). Executing the base software 390 may also refer to running at least a portion the base software 390 to perform the basic functions described. The basic functions may provide platforms and/or tools for subsequent steps of the configuration process.

Next at block B640, the general purpose processor 206 of the UE 200 is configured to detect a triggering event. As described, the triggering event may be the completion of build-time, the factory command, the SIM trigger (e.g., insertion, reading a parameter on the SIM, and/or the like), and/or the personnel selection.

Next at block B650, the general purpose processor 206 of the UE 200 is configured to select the target set of configuration routines in response to detecting the triggering event. In some embodiments, the UE 200 may be configured to select a configuration routine based on the type of the triggering event.

When the triggering event is the completion of build-time, the factory test command, and/or receiving the personnel selection, the target set of configuration routines may be predetermined by designated personnel of the OEM and/or the product services. The selected (e.g., predetermined) target set of configuration routines may be marked by a unique marker. Upon detecting the triggering event, the general purpose processor 206 of the UE 200 may be configured to identify the configuration routines based on the marker. The area-specific configuration routine, the country-specific configuration routine, the service provider-specific configuration routine, and the device-specific configuration may each be marked by the marker, and may be aggregated to form the selected target set of configuration routines.

When the triggering event is the completion of build-time, the factory test command, and/or personnel selection, the target set of configuration routines may be selected based on user input. For example, the touchscreen display 226 and/or the keypad 224 may receive an input with respect to selecting the target set of configuration routines. One or more separate sets of configuration routines may be displayed, via the touchscreen display 226 of the UE 200. The UE 200 may allow the user and/or the designated personnel to select one of the one or more separate sets to be the target set of configuration routines. The UE 200 may also allow the user and/or the designated personnel to select the target set of configuration routines by inputting a name (and/or a code representing the target set) of the target set of configuration routines.

When the triggering event is the UE 200 receiving at least one SIM, the general purpose processor 206 of the UE 200 may be configured to read one or more parameters stored on the SIM and select the target set of configuration routines based on the values of the one or more parameters. The general purpose processor 206 of the UE 200 may first create an indicator for the SIM in the manner described with respect to indicator table 400 (e.g., by creating an alphanumeric text based on the values of one or more parameters stored on the SIM). The general purpose processor 206 of the UE 200 may then match the indicator with the target set of configuration routines associated with the indicator. In some embodiments, the general purpose processor 206 of the UE 200 may access the mapping table 500 and matches the indicator with a corresponding configuration identifier, which identifies a set of configuration routine.

For example, with respect to the second entry 560, the indicator "40401" (e.g., in the indicator column 530) may correspond to the configuration identifier "99999991" (e.g., in the configuration identifier column 540). After obtaining the configuration identifier associated with the indicator, the general purpose processor 206 of the UE 200 may locate the corresponding set of configuration routines (e.g., "Vodafone-India" with respect to the second entry 560) based on the configuration identifier. The corresponding set of configuration routines may be located based on the configuration identifier via data provided by the indicator table 400.

In other embodiments, the general purpose processor 206 of the UE 200 is configured to directly map the indicator obtained with a set of configuration routines (i.e., without first obtaining a corresponding configuration identifier). As such, each configuration routine and/or set of configuration routines may be directly related to the indicator (e.g., a unique indicator may be stored with or points to each configuration routine or set of configuration routines). The mapping table 500 may not include any configuration identifiers or configuration identifier column 540.

The selection process for multi-SIM-based configuration is described herein at least with respect to FIG. 7.

Returning to FIGS. 1-6, next at block B660, the general purpose processor 206 of the UE 200 is configured to configure (or reconfigure) the UE 200 based on the selected target set of configuration routines. The selected target set of configuration routines may include at least the area-specific configuration routine, the country-specific configuration routine, the service provider-specific configuration routine, the device-specific configuration routine, and/or the like. Each configuration routine, as described, may include configuration instructions for configuring the UE for full functionality. The UE 200 may be rebooted upon a successful configuration/reconfiguration.

Next at block B670, the general purpose processor 206 of the UE 200 may be configured to delete configuration routines stored in the configuration storage 300 of the UE 200. In some embodiments, the deletion process may be initiated in response to the completion of configuring the UE 200 based on the selected target set of configuration routines. All or a part of all configuration routines may be deleted.

In some embodiments, the deletion process may be initiated in response to the completion of selecting the target set of configuration routines (i.e., the configuration routines other than the target set of configuration routines may be deleted simultaneous to the configuration step at block B660). Deleted configuration routines may be loaded or downloaded again (e.g., via a physically-connectable external device and/or via a network).

The configuration process 600 may be applicable to reconfigure the UE 200 (e.g., after the UE 200 has already been configured at least once). In a reconfiguration process, the general purpose processor 206 of the UE 200 classify configuration routines (such as, but not limited to, block B610) and group/store configuration routines into repositories (such as, but not limited to, block B620). In various embodiments, the classifying block (e.g., block B610) and the grouping/storing block (e.g., block B620) may not need to be executed when the classifying block and the grouping/storing block has already been executed for a previous configuration process. In addition, the general purpose processor 206 of the UE 200 may not need to configure the UE 200 based on configuration routines of the base software 390, given that the UE 200 has already been configured based on configuration routines of the base software 390. The general purpose processor 206 of the UE 200 may nevertheless execute the base software 390 to provide support for the reconfiguration process. In some embodiments, reconfiguration of the UE 200 requires that the UE 200 be first reverted back to an un-configured state (e.g., a state where the UE 200 is not configured according to any configuration routines other than that of the base software 390, such as the state of the UE 200 before any configuration other than that of the base software 390 takes place). Next, the reconfiguration process may proceed to the detecting block (e.g., block B640), the selecting block (e.g., block B650), the configuring block (e.g., block B660), and the deleting block (e.g., block B670), as described.

In some embodiments, when a new and/or additional SIM is received and/or detected, the UE 200 may be placed in the un-configured state. The user may be presented with an option (e.g., through the touchscreen display 226) to place the UE 200 into the un-configured state (e.g., through the keypad 224 and/or the touchscreen display 226). In other embodiments, the UE 200 may automatically entry the un-configured state. Next, the configuration process such as described may be restarted based on the new and/or additional SIM being inserted.

FIG. 7 is a process flowchart illustrating an example of a selection process 700 according to various multi-SIMs embodiments (e.g., embodiments relating to DSDS, DSDA, TSTS, TSTA, and/or other additional number of SIMs). With reference to FIGS. 1-7, the selection process 700 may be a process occurring during the detecting block (e.g., block B640) and/or the selecting block (e.g., block B650) during the configuration process 600. In particular, block B710 may correspond to block B640, and blocks B720-B740 may correspond to block B650.

First at block B710, the UE 200 receives a plurality of SIMs via the SIM interfaces (e.g., the first SIM interface 202a and the second SIM interface 202b in a dual-SIM context). In some embodiments, a plurality of SIMs is determined to be received when the UE 200 has been powered on to detect (e.g., via the general purpose processor 206 of the UE 200) that a plurality SIMs are received by the SIM interfaces. In some embodiments, the plurality of SIMs is determined to be received when the UE 200 detects (e.g., via the general purpose processor 206 of the UE 200) insertion of two or more SIMs while the UE 200 is powered on. Two SIMs may be determined to be inserted at the same time when both SIMs may be detected to be received within a predetermined period of time apart (e.g., the predetermine period of time may be 2 seconds, 5 seconds, 10 seconds, 30 seconds, and/or the like).

Next at block B720, an indicator for each SIM is determined (e.g., via the general purpose processor 206 of the UE 200) based on the value of parameters stored on each SIM. The indicator for each SIM of the plurality of SIMs received may be determined in at least the same manner as described with respect to block B650 of the configuration process 600. Accordingly a plurality of indicators may be created, each of which may correspond to a different SIM.

Next at block B730, the general purpose processor 206 of the UE 200 is configured to match a plurality of target sets of configuration routines for each of the plurality of SIMs based on the associated indicators. Each target set of configuration routines may be matched in at least the same manner as described with respect to block B650 of the configuration process 600. Accordingly a plurality of matched target sets may be identified, each of which may correspond to a different SIM.

Next at block B740, at least one set of the matched sets of configuration routines is selected to be the target set of configuration routines. In some embodiments, the UE 200 is configured to select the target set based on received user input (e.g., via the keypad 224 and/or the touchscreen display 226 of the UE 200). The touchscreen display 226 of the UE 200 may first display to the user of the UE 200 identifying information of each of the matched sets of configuration routines. The identifying information may include names for the area, country, service provider, and/or the like. For example, the identifying information displayed (e.g., via the touchscreen display 226 of the UE 200) may be "Vodafone-India." In this example, "India" relates to the area and/or country corresponding to the matched set of configuration routines, and "Vodafone" relates to the service provider corresponding to the matched set of configuration routines. Then the user may select one of the matched target sets of configuration routines in the manner described.

In other embodiments, the UE 200 is configured to automatically select one of the matched sets of configuration routines (e.g., with the general purpose processor 206 of the UE 200). In particular embodiments, the UE 200 determines the location of the UE 200 with a geo-location device (not shown). The geo-location device may include hardware and software for determining geographic location of the UE 200, such as, but not limited to a global positioning system (GPS)

or other satellite positioning system, terrestrial positioning system, Wi-Fi location system, combinations thereof, or the like. The geo-location device may be enabled by the base software 390. The general purpose processor 206 of the UE 200 may then select one of the matched set of configuration routines by matching the current geo-location of the UE 200 with the area and/or country associated with each set of the matched configuration routines. In one example, the matched sets of configuration routines may include "Vodafone-India," "FLY-Russia," and "China Unicom-China." As the geo-location device of the UE 200 determines that the current location of the UE 200 is in India, then the UE 200 may select Vodafone-India as the target set of configuration routines.

Figure 8:
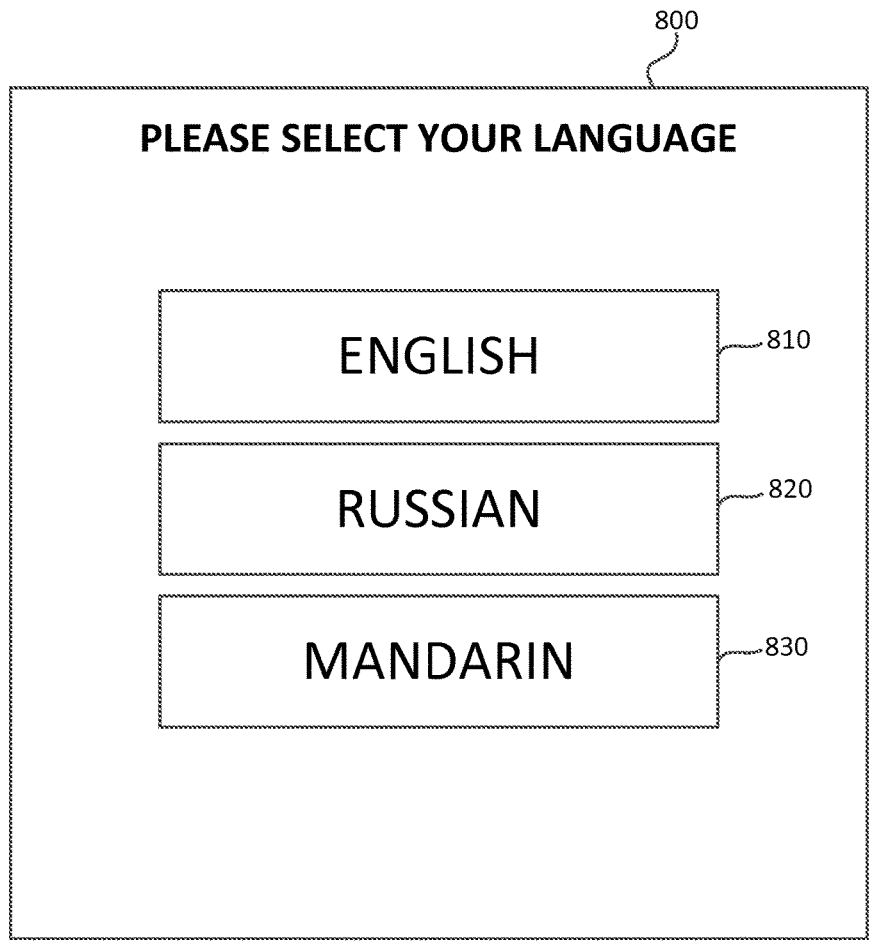
FIG. 8 illustrates an example of a language selection screen according to various embodiments.

FIG. 8 illustrates an example of a language selection screen 800 according to various embodiments. With reference to FIGS. 1-8, the touchscreen display 226 of the UE 200 may be configured to display the language selection screen 800. In some embodiments, the language selection screen is enabled by the base software 390 and configured to be displayed after the executing of the base software 390 (e.g., after block B630 in the configuration process). In some embodiments, the language selection screen 800 is displayed before and/or during the configuring of the UE 200 (e.g., block B660), given that the UE 200 may configure its language settings (e.g., region and language settings, application language settings, default system language settings, and/or the like) based on the user selection. In some embodiments, the language selection screen 800 is displayed before (and/or as a first step of) the selecting of the target set of configuration routines out of the matched sets (e.g., at block B650 and/or B740).

The language selection screen 800 includes a plurality of language elements (e.g., a first language element 810, a second language element 830, a third language element 830, and/or the like). Each language element may be a user interactive element selectable by the user via the touchscreen display 226 and/or the keypad 224. For example, the first language element 810 may configure the UE 200 to display in English, the second language element 830 may configure the UE 200 to display in Russian, and the third language element 830 may configure the UE 200 to display in Mandarin. Each language element may be enabled by the base software 390. In some embodiments, the displayed language elements may correspond to the area and/or country associated with each of the SIMs inserted. The area and/or country associated with each of the SIMs may be extracted by the general purpose processor 206 from the value of the parameters (e.g., MCC, MNC, and/or the like) stored on each SIM. In other embodiments, all language options available (e.g., all language options as enabled by the base software 390) may be presented to the user via the touchscreen display 226. In addition, the language elements may present language options based on the location of the UE 200 (e.g., as enabled by the geo-location device). For example, the language elements may present languages used in the area/country associated with the current location of the UE 200.

Figure 9:
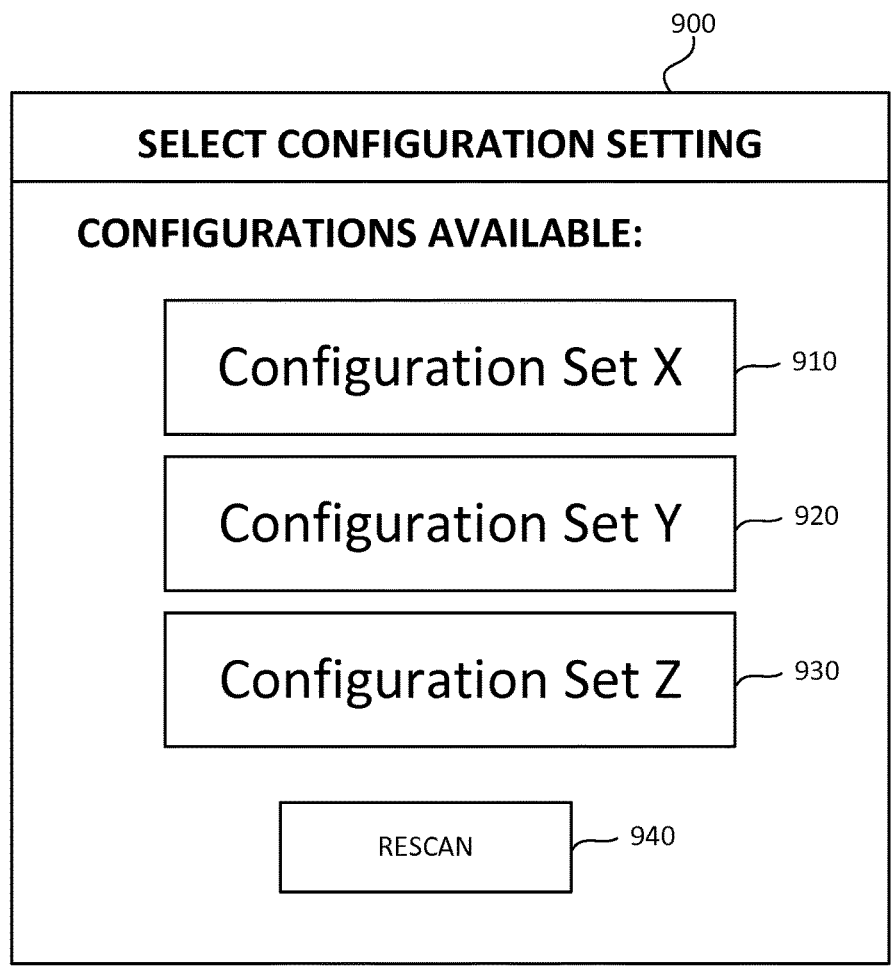
FIG. 9 illustrates an example of a target configuration selection screen according to various embodiments.

FIG. 9 illustrates an example of a target configuration selection screen 900 according to various embodiments. With reference to FIGS. 1-9, the touchscreen display 226 of the UE 200 may be configured to display the target configuration selection screen 900, for example, in response to a user selecting a language option (i.e., the target configuration selection screen 900 may be displayed by the touchscreen display 226 in the selected language).

The target configuration selection screen 900 includes a plurality of configuration elements (e.g., a first configuration element 910, a second configuration element 930, a third configuration element 930, and/or the like). Each configuration element may be a user interactive element selectable by the user via the touchscreen display 226 and/or the keypad 224. Selection of one configuration element may trigger configuration of the UE 200 based on the set of configuration routines associated with that configuration element. For example, selection of the first configuration element 910 (e.g., shown as "Configuration Set X," which may be Vodafone-India) may trigger configuration of the UE 200 based on configuration routines associated with an area (e.g., Asia), country (e.g., India), service provider (e.g., Vodafone), and/or the like. Selection of the second configuration element 920 (e.g., shown as "Configuration Set Y," which may be FLY-Russia) may trigger configuration of the UE 200 based on configuration routines associated with a separate area (e.g., Europe), separate country (e.g., Russia), and separate service provider (e.g., "FLY"), and/or the like. Selection of the third configuration element 930 (e.g., shown as "Configuration Set Z," which may be China Unicom-China) may trigger configuration of the UE 200 based on configuration routines associated with a same or different area (e.g., Asia), country (e.g., China), service provider (e.g., China Unicom), and/or the like.

The target configuration selection screen 900 provides user interactive elements that, if activated, would allow the UE 200 to stay at the un-configured state. In some embodiments, the target configuration selection screen 900 provides a rescan element (e.g., configured as a user interactive element). When the rescan activated, the SIMs received by the UE 200 may be rescanned for the values of the parameters stored in the SIMs. The UE 200 may be configured to display additional and/or altered configuration elements representing additional and/or altered matched set(s) of configuration routines.

Figure 10:
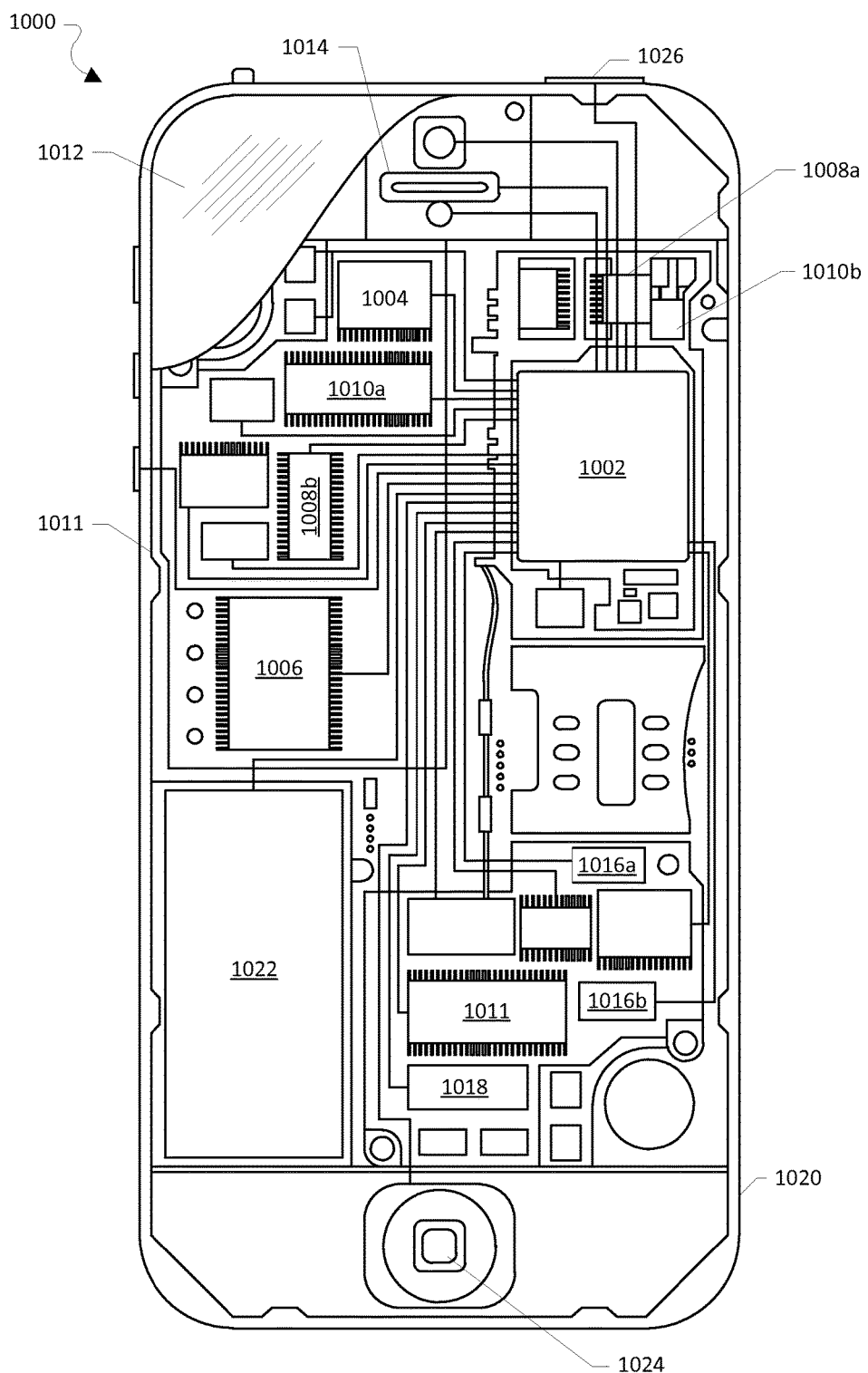
FIG. 10 is a component block diagram of a user equipment suitable for use with various embodiments.

The various embodiments may be implemented in any of a variety of UEs, such as UE 1000, an example of which (UE 200 of FIG. 2, which may correspond to the UE 110 in FIG. 1) is illustrated in FIG. 10. As such, the UE 1000 may implement the process and/or the apparatus of FIGS. 1-9, as described herein.

With reference to FIGS. 1-10, the UE 1000 may include a processor 1002 coupled to a touchscreen controller 1004 and an internal memory 1006. The processor 1002 may correspond to the processor 206. The processor 1002 may be one or more multi-core integrated circuits designated for general or specific processing tasks. The internal memory 1006 may correspond to the memory 214. The memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the UE 1000 need not have touch screen capability. The touch screen controller 1004, the touchscreen panel 1012 may correspond to the user interface 203 depicted in FIG. 2 and described herein.

The UE 1000 may have one or more cellular network transceivers 1008a, 1008b coupled to the processor 1002 and to two or more antennae 1010 and configured for sending and receiving cellular communications. The transceivers 1008 and antennae 1010a, 1010b may be used with the above-mentioned circuitry to implement the various embodiment methods. The UE 1000 may include two or more SIM cards 1016a, 1016b, corresponding to SIM-1 204a and SIM-2 204b, coupled to the transceivers 1008a, 1008b and/or the processor 1002 and configured as described above. The UE 1000 may include a cellular network wireless modem chip 1011 that enables communication via a cellular network and is coupled to the processor. The one or more cellular network transceivers 1008a, 1008b, the cellular network wireless modem chip 1011, and the two or more antennae 1010 may correspond to the RF resources 218a, 218b.

The UE 1000 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown).

The UE 1000 may also include speakers 1014 for providing audio outputs. The UE 1000 may also include a housing 1020, constructed of a plastic, metal, or a combination of materials, for containing all or some of the components discussed herein. The UE 1000 may include a power source 1022 coupled to the processor 1002, such as a disposable or rechargeable battery. The rechargeable battery may also be coupled to a peripheral device connection port (not shown) to receive a charging current from a source external to the UE 1000. The UE 1000 may also include a physical button 1024 for receiving user inputs. The UE 1000 may also include a power button 1026 for turning the UE 1000 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for configuring a user equipment (UE), the method comprising:
    storing, by the UE, a plurality of configuration routines, wherein the plurality of configuration routines comprises two or more area-specific configuration routines and two or more country-specific configuration routines, each of the area-specific configuration routines corresponds to an area having two or more countries, the area being associated with at least one service provider and the area-specific configuration routine being associated with configuration instructions applied to UEs operating in the area;

classifying each of the plurality of configuration routines to be at least one of a service provider-specific configuration routine, or a device-specific configuration routine, wherein the service provider-specific configuration routine is associated with:
a service provider associated with the area, and configuration instructions applied to UEs operated by the service provider;
receiving, by the UE, a first subscriber identity module (SIM);
detecting an event to trigger configuration of the UE, wherein the detected event is at least receiving the first SIM at the UE;
determining a configuration identifier based, at least in part, on the detected event;
selecting, by the UE, a target set of configuration routines from the plurality of configuration routines based, at least in part, on at least one parameter value stored on the first SIM and the configuration identifier;
configuring at least one setting of the UE based, at least in part, on the target set of configuration routines;
receiving a second SIM; and
determining whether the second SIM is locked out from configuring the UE based, at least in part, on the first SIM and at least one parameter on the second SIM.

2. The method of claim 1, wherein the at least one setting of the UE is from the group consisting of: RF settings, modem settings, hardware settings, application settings, and media settings of the UE.

3. The method of claim 1, wherein each of the area-specific configuration routines comprise at least one from the group consisting of a hardware configuration routine, a software configuration routine, a regional regulation configuration routine, and a media configuration routine.

4. The method of claim 1, wherein the service provider-specific configuration routine is executed to configure at least one setting from the group consisting of: UE settings, network settings, media settings, messaging application settings, language settings, location positioning configurations, status bar settings, Bluetooth settings, USB settings, WiFi settings, and email settings.

5. The method of claim 1, wherein:
the country-specific configuration routines comprise configuration instructions applied to UEs operating in at least one country; and
the service provider-specific configuration routine comprises instructions applied to UEs operated by a service provider.

6. The method of claim 5, wherein the target set of configuration routines includes at least one from the group consisting of: the area-specific configuration routines, the country-specific configuration routines, and the service provider-specific configuration routine.

7. The method of claim 1, wherein:
the area-specific configuration routines and the service provider-specific configuration routine are stored in at least one of a common repository of a memory device associated with the UE or in a hidden partition of a memory device associated with the UE.

8. The method of claim 1, wherein:
the event to trigger configuration is at least one from the group consisting of: a subsidy lock based on the SIM, a factory build, a factory test command, a user input, and a command received via a network.

9. The method of claim 8, further comprising:
selecting, by the UE, a secondary target set of configuration routines from the plurality of configuration routines, the secondary target set of configuration routines comprising at least one of the plurality of configuration routines; and
configuring the at least one setting of the UE based, at least in part, on the secondary target set of configuration routines, wherein the secondary target set of configuration routines is selected and executed in response to a second event to trigger configuration of the UE, the second event is at least one from the group consisting of: receiving the SIM, a subsidy lock based on the SIM, a factory build, a factory test command, a user input, and a command received via a network.

10. The method of claim 1, further comprising defining a plurality of package value levels, wherein the target set of configuration routines comprises at least one configuration routine corresponding to one of the plurality of package value levels.

11. The method of claim 1, wherein the selecting of the target set of configuration routines comprises matching one of the at least one parameter value stored on each of the first SIM and the second SIM with the target set of configuration routines.

12. The method of claim 1, wherein the selecting of the target set of configuration routines comprises determining a plurality of matched sets of configuration routines, each of the plurality of the matched sets of configuration routines being matched to one of the first SIM or the second SIM.

13. The method of claim 12, wherein the selecting of the target set of configuration routines further comprises selecting, by the UE, the target set of configuration routines from the matched sets of configuration routines.

14. The method of claim 13, wherein the target set of configuration routines is selected from the matched sets of configuration routines based, at least in part, on user input.

15. The method of claim 13, wherein the target set of configuration routines is selected from the matched sets of configuration routines automatically based, at least in part, on a location of the UE.

16. The method of claim 12, wherein the determining a plurality of matched sets of configuration routines comprises determining a plurality of indicators, each of the plurality of indicators is determined based on the at least one parameter value stored on each of the first SIM and the second SIM.

17. The method of claim 1, wherein the at least one parameter value includes at least one from the group consisting of: a Mobile Network Code, a Mobile Country Code, a Service Provider Name, and a Group Identifier.

18. The method of claim 1, wherein the device-specific configuration routine is used to configure one or more settings from a group of settings consisting of: device hardware settings, device-specific hardware driver configurations, UE settings, network settings, media settings, messaging application settings, language settings, location positioning configurations, status bar settings, Bluetooth settings, USB settings, WiFi settings, and email settings.

19. The method of claim 1, wherein the detected event is encoded in the configuration identifier.

20. The method of claim 1, further comprising:
creating a plurality of indicators, each indicator corresponding to a different SIM; and matching the target set of configuration routines for each of the first and the second SIM based on associated indicators.

21. The method of claim 1, further comprising: reconfiguring at least one setting on the UE when the second SIM is not locked.

22. The method of claim 1, wherein the receiving the second SIM triggers an event to configure the UE.

23. The method of claim 1 the second SIM is locked out when parameters stored on the second SIM are not associated with an approved area, country, or service provider.

24. The method of claim 1, wherein the event to trigger configuration is a cloud command.

25. An apparatus for configuring a user equipment (UE), the apparatus comprising:
a processor;
a memory storing instructions that, when executed by the processor, cause the apparatus to:
store a plurality of configuration routines, wherein the plurality of configuration routines comprises two or more area-specific configuration routines and two or more country-specific configuration routines, each of the area-specific configuration routines corresponds to an area having two or more countries, the area being associated with at least one service provider and the area-specific configuration routine being associated with configuration instructions applied to UEs operating in the area;
classify each of the plurality of configuration routines to be at least one of a service provider-specific configuration routine or a device-specific configuration routine, wherein the service provider-specific configuration routine is associated with:
a service provider associated with the area, and configuration instructions applied to UEs operated by the service provider;
detect an event to trigger configuration of the UE, wherein the detected event is a reception of a first subscriber identity module (SIM) at the UE;
determine a configuration identifier based, at least in part, on the detected event, wherein the detected event is at least receiving the first SIM at the UE;
select a target set of configuration routines from the plurality of configuration routines based, at least in part, on at least one parameter value stored on the first SIM and the configuration identifier;
configure at least one setting of the UE based, at least in part, on the target set of configuration routines; and
determining whether a second SIM is locked out from a configuration of the UE based, at least in part, on the first SIM and at least one parameter on the second SIM.

26. The apparatus of claim 25, wherein execution of the instructions to select the target set of configuration routines causes the apparatus to:
determine a plurality of matched sets of configuration routines, each of the plurality of the matched sets of configuration routines being matched to one of the first SIM or the second SIM.

27. The apparatus of claim 26, wherein the target set of configuration routines is selected from the matched sets of configuration routines automatically based, at least in part, on a location of the UE.

28. An apparatus for configuring a user equipment (UE), the apparatus comprising:
means for storing a plurality of configuration routines, wherein the plurality of configuration routines comprises two or more area-specific configuration routines and two or more country-specific configuration routines, each of the area-specific configuration routines corresponds to an area having two or more countries, the area being associated with at least one service provider and the area-specific configuration routine being associated with configuration instructions applied to UEs operating in the area;
means for classifying each of the plurality of configuration routines to be at least one of a service provider-specific configuration routine or a device-specific configuration routine, wherein the service provider-specific configuration routine is associated with:
a service provider associated with the area, and configuration instructions applied to UEs operated by the service provider;
means for receiving a first subscriber identity module (SIM);
means for detecting an event to trigger configuration of the UE, wherein the detected event is at least receiving the first SIM;
means for determining a configuration identifier based, at least in part, on the detected event;
means for selecting a target set of configuration routines from the plurality of configuration routines based, at least in part, on at least one parameter value stored on the first SIM and the configuration identifier;
means for configuring at least one setting of the UE based, at least in part, on the target set of configuration routines;
means for receiving a second SIM; and
means for determining whether the second SIM is locked out from configuring the UE based, at least in part, on the first SIM and at least one parameter on the second SIM.

29. A non-transitory computer-readable medium containing program instructions that, when executed by a processor of a user equipment (UE), causes the UE to:
store a plurality of configuration routines, wherein the plurality of configuration routines comprises two or more area-specific configuration routines and two or more country-specific configuration routines, each of the area-specific configuration routines corresponds to an area having two or more countries, the area being associated with at least one service provider and the area-specific configuration routine being associated with configuration instructions applied to UEs operating in the area;
classify each of the plurality of configuration routines to be at least one of a service provider-specific configuration routine or a device-specific configuration routine, wherein the service provider-specific configuration routine is associated with:
a service provider associated with the area, and configuration instructions applied to UEs operated by the service provider;
detect an event to trigger configuration of the UE, wherein the detected event is a reception of a first subscriber identity module (SIM) at the UE;
determine a configuration identifier based, at least in part, on the detected event, wherein the detected event is at least receiving the first SIM at the UE;
select a target set of configuration routines from the plurality of configuration routines based, at least in part, on at least one parameter value stored on the first SIM and the configuration identifier;
configure at least one setting of the UE based, at least in part, on the target set of configuration routines; and
determine whether a second SIM is locked out from a configuration of the UE based, at least in part, on the first SIM and at least one parameter on the second SIM.

* * * * *